US011780513B2

(12) United States Patent
Gagne et al.

(10) Patent No.: US 11,780,513 B2
(45) Date of Patent: Oct. 10, 2023

(54) REAR TRACK ASSEMBLY FOR A VEHICLE

(71) Applicant: SOUCY INTERNATIONAL INC., Drummondville (CA)

(72) Inventors: Maxime Gagne, St-François Xavier de Brampton (CA); Louis-Frederic Marchildon, Drummondville (CA); Charles Devin, Windsor (CA); Patrick L'Herault, St-Majorique de Grantham (CA)

(73) Assignee: SOUCY INTERNATIONAL INC., Drummondville (CA)

( * ) Notice: Subject to any disclaimer, the term of this patent is extended or adjusted under 35 U.S.C. 154(b) by 821 days.

(21) Appl. No.: 16/277,167

(22) Filed: Feb. 15, 2019

(65) Prior Publication Data
US 2019/0248432 A1      Aug. 15, 2019

Related U.S. Application Data

(60) Provisional application No. 62/631,436, filed on Feb. 15, 2018.

(30) Foreign Application Priority Data

Feb. 15, 2018   (CA) ................................ CA 2995265

(51) Int. Cl.
| | |
|---|---|
| *B62D 55/10* | (2006.01) |
| *B62D 55/26* | (2006.01) |
| *B62D 55/24* | (2006.01) |
| *B62D 55/065* | (2006.01) |

(52) U.S. Cl.
CPC ........... *B62D 55/10* (2013.01); *B62D 55/065* (2013.01); *B62D 55/24* (2013.01); *B62D 55/244* (2013.01); *B62D 55/26* (2013.01)

(58) Field of Classification Search
CPC .. B62M 27/02; B62M 27/026; B62M 27/027; B62D 55/24; B62D 55/244
USPC ........................................................ 305/168
See application file for complete search history.

(56) References Cited

U.S. PATENT DOCUMENTS

| | | | | |
|---|---|---|---|---|
| 4,023,865 | A | * | 5/1977 | Morissette ............. B62D 55/24 305/168 |
| 5,415,470 | A | * | 5/1995 | Courtemanche ....... B62D 55/24 305/117 |
| 6,095,275 | A | * | 8/2000 | Shaw ..................... B62M 27/02 180/185 |

(Continued)

*Primary Examiner* — Anne Marie M Boehler
(74) *Attorney, Agent, or Firm* — BCF LLP

(57) ABSTRACT

A track assembly mountable to a rotatable rear axle of a vehicle includes a frame, a drive wheel rotationally mounted to the frame and being structured to be attached to the axle of the vehicle, a front idler wheel and a rear idler wheel assemblies mounted to the frame, and a track. The track has an inner surface facing the drive wheel, and an outer surface opposite the inner surface. The outer surface has a plurality of traction lugs distributed along the outer surface. The track includes a plurality of longer transverse reinforcement rods distributed therethrough and a plurality of shorter transverse reinforcement rods distributed therethrough. The shorter transverse reinforcement rods are shorter in length than the longer transverse reinforcement rods. Each of the longer and shorter transverse reinforcement rods is aligned along at least a part of its length with at least one of the traction lugs.

18 Claims, 14 Drawing Sheets

(56) References Cited

U.S. PATENT DOCUMENTS

| | | | | |
|---|---|---|---|---|
| 6,874,586 B2* | 4/2005 | Boivin | ................... | B62D 55/04 |
| | | | | 180/9.26 |
| 7,712,557 B2* | 5/2010 | Duceppe | .............. | B62D 55/065 |
| | | | | 180/9.21 |
| 8,312,945 B2* | 11/2012 | Bessette | ............... | B62D 55/084 |
| | | | | 180/9.54 |
| 2002/0153774 A1* | 10/2002 | Courtemanche | ....... | B62D 55/26 |
| | | | | 305/168 |
| 2015/0183464 A1* | 7/2015 | Mannering | .......... | B62D 55/084 |
| | | | | 180/9.46 |
| 2016/0114840 A1* | 4/2016 | L'Herault | ............ | B62D 55/065 |
| | | | | 305/167 |
| 2016/0200378 A1* | 7/2016 | Dandurand | ............ | B62D 55/14 |
| | | | | 305/177 |
| 2018/0229784 A1* | 8/2018 | Marchildon | ......... | B62D 55/104 |
| 2019/0144055 A1* | 5/2019 | Zuchoski | ............. | B62D 55/104 |
| | | | | 180/9.21 |

\* cited by examiner

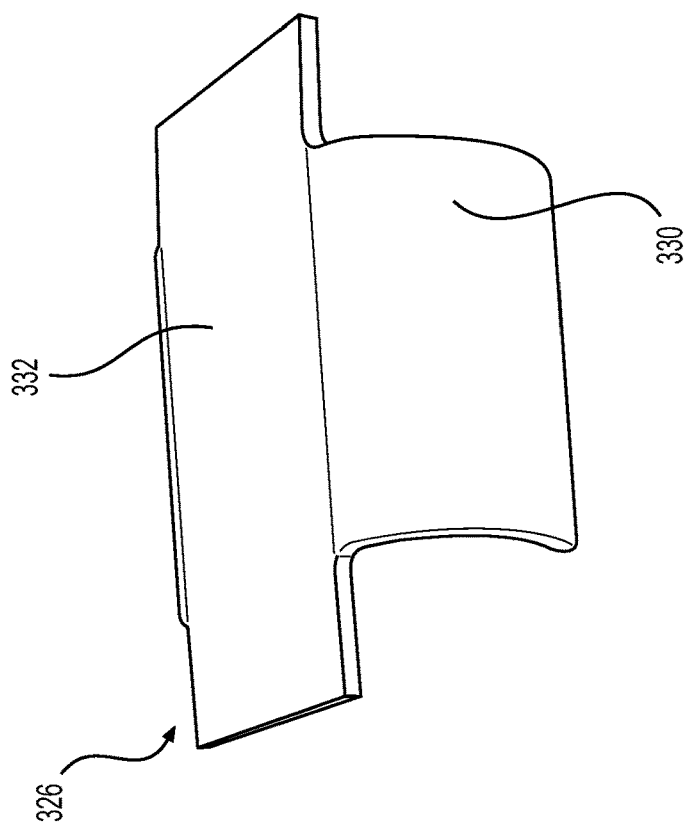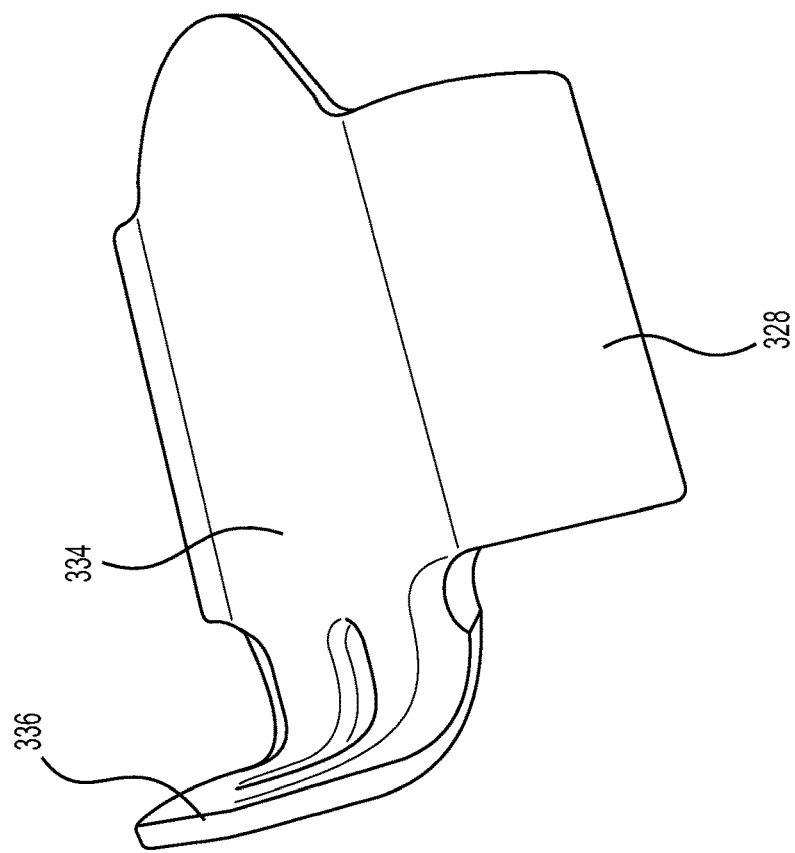
FIG. 14

REAR TRACK ASSEMBLY FOR A VEHICLE

CROSS-REFERENCE

The present application claims priority to U.S. Provisional Patent Application Ser. No. 62/631,436, filed Feb. 15, 2018, entitled "Rear Track Assembly For A Vehicle", which is incorporated herein by reference in its entirety.

TECHNICAL FIELD

The present technology relates to track assemblies and vehicles having track assemblies.

BACKGROUND

All-Terrain Vehicles ("ATV's") are four-wheeled off-road vehicles. ATV's are designed for "all" terrains. ATV wheels are usable with "all" terrains, but may not be optimized for one or more particular types of terrain. Given that wheels do not provide optimal traction on certain types of terrain, e.g. mud, snow, sand, etc., track systems were developed to be used on ATV's in place of the wheels. ATV's, however, including their frames, suspensions, and fairings, were designed for having wheels as ground-contacting elements, and not for having tracks.

Track systems have been developed to replace wheels of ATVs, in order to improve traction of the ATVs in some driving conditions. Wheels are circular in shape (and thus when rotated maintain the same shape—and are designed to be rotated in use), and are generally smaller than track systems. Tracks systems typically have frames that are triangular in shape and are generally larger than wheels.

Existing track systems are suitable for their intended purposes. However, improvements to existing systems are always desirable.

SUMMARY

In conventional wisdom, to improve vehicle performance, such as acceleration, the horsepower of the vehicle's motor is increased. Such an approach is often practiced with snowmobiles.

However, as it has been found by the creators of the present technology, sometimes increasing a vehicle's motor horsepower may be relatively expensive and may not provide the desired performance improvements in some driving conditions, such as deep snow driving conditions. The creators of the present technology have found that this may more often be the case with vehicles such as ATVs and Side by Side vehicles, than with snowmobiles. In one aspect, the creators of the present technology have found that the propulsion mechanisms by which ATV and Side-by-Side track assemblies propel such vehicles differ from the propulsion mechanisms of snowmobiles, at least when such vehicles are used on snow.

That is, the track of a snowmobile is designed to eject snow from under the track and thereby propel the snowmobile. ATV and Side-by-side vehicle tracks, on the other hand, often pull on snow trapped between traction lugs of the tracks in order to propel such vehicles. The creators of the present technology have found that this difference in propulsion mechanisms may be leveraged in some cases to provide vehicle performance improvements for some types of driving conditions and for some types of terrain without necessarily needing to increase a vehicle's horsepower.

For example, it has been found that providing a track assembly for an ATV or a Side-by-Side vehicle, the track assembly having a track with a track length that is in a particular range of track lengths improves vehicle performance, including acceleration, in at least some driving conditions. As another example, it has been found that providing a track assembly for an ATV or a Side-by-Side vehicle, the track assembly having a track with a track length that is in a particular range of track lengths, in combination with the track having traction lugs that have traction lug heights in a particular range of traction lug heights, improves vehicle performance, including acceleration, in at least some driving conditions. It has additionally been found that providing a track system having a frame that has an effective frame height in a particular range of effective frame heights, as will be described herein, in combination with an effective frame length in a particular range of effective frame lengths, also as will be described herein, improves performance in some driving conditions.

It has also been found that providing particular combinations of track length and traction lug height(s) for an ATV or a Side-by-Side vehicle in a further combination with certain additional features described in this document, improves vehicle performance in at least some driving conditions. Thus, the present technology provides a track system for use with a vehicle, such as an ATV, a Side-by-Side vehicle, or other similar vehicles, provides improved vehicle performance, including acceleration, in at least some driving conditions, including at least some snow driving conditions. In another aspect, the present technology provides a track (an endless track) that could be used with track assemblies for vehicles such as ATVs or Side-by-Side, including the track assemblies described in this document. The track has a structure that makes the track relatively cheaper to manufacture for at least some applications, including some applications when the track is used with the track assemblies described herein, while providing a sufficient level of stiffness and other properties thereof to be suitable for those applications.

In one aspect, there is provided herein a track assembly to be mounted to a rotatable rear axle of a vehicle, the rotatable rear axle being structured for mechanical attachment of a wheel thereto. The track assembly includes: a frame having a front, a rear, a bottom, a left side, and a right side; a drive wheel rotationally mounted to the frame for rotation about a drive wheel axis positioned in a vertical drive wheel plane, the drive wheel having a peripheral surface, the drive wheel being structured to be attached to the axle of the vehicle when the wheel is removed; a front idler wheel assembly mounted at the front of the frame for rotation about a front idler wheel assembly axis parallel to the drive wheel axis, the front idler wheel assembly having a peripheral surface; a rear idler wheel assembly mounted at the rear of the frame for rotation about a rear idler wheel assembly axis parallel to the drive wheel axis, the rear idler wheel assembly having a peripheral surface; and a track having an inner surface facing the drive wheel, and an outer surface opposite the inner surface, the outer surface having a plurality of traction lugs distributed along the outer surface. The track includes a plurality of longer transverse reinforcement rods distributed therethrough and a plurality of shorter transverse reinforcement rods distributed therethrough, the shorter transverse reinforcement rods being shorter in length than the longer transverse reinforcement rods. Each of the longer and shorter transverse reinforcement rods is aligned along at least a part of its length with at least one of the traction lugs.

The drive wheel, the front idler wheel assembly and the rear idler wheel assembly are positioned relative to the frame to support the track around the drive wheel peripheral surface, the front idler wheel assembly peripheral surface, and the rear idler wheel assembly peripheral surface. The track is in driving engagement with the drive wheel. At least one of the front idler wheel assembly and the rear idler wheel assembly are selectively movable between a plurality of longitudinally-distributed tension positions to tension the track.

In some implementations, the frame has an effective frame length equal to a horizontal distance between a foremost point on the outer surface of the track and the rear idler wheel assembly axis. The effective frame length is between 48 inches and 60 inches. The frame has an effective frame height equal to a vertical distance between the drive wheel axis and a point on the outer surface of the track, the point being positioned directly below the drive wheel axis. The effective frame height is between 17 inches and 20 inches.

In some embodiments, the track assembly further includes a longitudinally-extending left slide rail connected to the bottom of the frame and having a bottom surface, a front end, a rear end and a length; and a longitudinally-extending right slide rail connected to the bottom of the frame and having a bottom surface, a front end, a rear end, and a length.

In some embodiments, the drive wheel, wheels of the front idler wheel assembly and wheels of the rear idler wheel assembly are the sole wheels of the track assembly contacting the track.

In some embodiments, the track assembly further includes a plurality of mid-rollers, each mid-roller of the plurality of mid-rollers being connected to at least one of the left slide rail and the right slide rail to rotate about a mid-roller axis that defines a mid-roller plane with the drive wheel axis. In such embodiments, the mid-roller plane defines an angle with the vertical drive wheel plane that has a magnitude of not more than 20 degrees.

In some embodiments, the plurality of mid-rollers is positioned relative to the left slide rail and the right slide rail such that each mid-roller in the plurality of mid-rollers extends downward past the bottom surface of each of the left slide rail and the right slide rail by 2/25.4 inches to 6/25.4 inches (2 millimetres to 6 millimetres, respectively).

In some embodiments, the track assembly further includes a longitudinally-extending central slide rail connected to the bottom of the frame. In such embodiments, the central slide rail is positioned between the left slide rail and the right slide rail.

In some embodiments, each traction lug of the plurality of traction lugs has a lug length of approximately one-third of a width of the track.

In some embodiments, each traction lug of the plurality of traction lugs has a lug length of approximately one-quarter of a width of the track.

In some embodiments, the plurality of traction lugs is arranged in a 2-1 repeating pattern.

In some embodiments, the plurality of traction lugs is arranged in a 2-2 repeating pattern.

In some embodiments, at least some traction lugs in the plurality of traction lugs are longitudinally spaced from each other by 5 to 8 inches (127 millimetres to 203.2 millimetres, respectively).

In some embodiments, the longer transverse reinforcement rods alternate with the shorter transverse reinforcement rods along a longitudinal direction in the track.

In some embodiments, the longer transverse reinforcement rods alternate with the shorter transverse reinforcement rods in a long-short-long-short pattern.

In some embodiments, the track assembly further includes: a first plurality of L-shaped clips mounted to the track such that each clip of the first plurality of L-shaped clips passes with each revolution of the track around the frame of the track assembly between the left slide rail and the track, each clip of the first plurality of L-shaped clips having an upstanding L-portion extending from the track toward the frame of the track assembly; and a second plurality of L-shaped clips mounted to the track such that each clip of the second plurality of L-shaped clips passes with each revolution of the track around the frame of the track assembly between the right slide rail and the track, each clip of the second plurality of L-shaped clips having an upstanding L-portion extending from the track toward the frame of the track assembly.

In some embodiments, the each clip of the first and second pluralities of clips is mounted to the track over a longer transverse reinforcement rod of the plurality of longer transverse reinforcement rods, the upstanding L-portion of a first sub-plurality of clips of the first plurality of L-shaped clips is positioned on a left side of the left slide rail, the upstanding L-portion of a second sub-plurality of clips of the first plurality of L-shaped clips is positioned on a right side of the left slide rail, the upstanding L-portion of a first sub-plurality of clips of the second plurality of L-shaped clips is positioned on a left side of the right slide rail, and the upstanding L-portion of a second sub-plurality of clips of the second plurality of L-shaped clips is positioned on a right side of the right slide rail.

In some embodiments, the first and second sub-pluralities of clips of the first plurality of L-shaped clips alternate in a right-left-right pattern along the track's length; and the first and second sub-pluralities of clips of the second plurality of L-shaped clips alternate in a right-left-right pattern along the track's length.

In some embodiments, the rear idler wheel assembly has four idler wheels.

In some embodiments, the track assembly further includes a dynamic traction device having one end connected to the frame and another end connected to the vehicle when the track assembly is in use.

In some embodiments, the track has a track perimeter of 135 inches to 180 inches (3429 millimetres to 4572 millimetres, respectively).

In some embodiments, the front idler wheel assembly has a front idler wheel assembly radius, the bottom surface of each of the left slide rail and the right slide rail has an upward curvature having an upward radius of curvature, the upward curvatures of the left slide rail and the right slide rail are sized such that the track bends around the front idler wheel assembly and the upward curvatures of the left and right slide rails about an effective wheel radius, and the effective wheel radius is greater than each of the front idler wheel assembly radius and the upward radius of curvature.

In some embodiments, the drive wheel, the front idler wheel assembly, the rear idler wheel assembly, the bottom surfaces of the left and right slide rails, and the track are sized and positioned relative to each other such that when: a) the track assembly is mounted to the vehicle, b) the vehicle is traveling forward on flat level surface terrain covered with snow, and c) the track is being driven by the drive wheel about a path around the drive wheel, the front idler wheel assembly, the left and right slide rails, and the rear idler wheel assembly, each traction lug in the plurality of the traction lugs enters the snow substantially perpendicular to the flat level surface terrain. In such embodiments, each traction lug remains perpendicular to the flat level surface terrain as the track travels about its path at least until that traction lug begins to exit the snow.

In a further aspect, there is also provided a vehicle having a rotatable rear axle that is structured for mechanical attachment of a wheel thereto, and having an embodiment of the track assembly described above being attached to the axle to support the vehicle on terrain.

In some embodiments, the vehicle is one of: an All-Terrain Vehicle, a Side-by-Side Vehicle, and a wheelchair.

In some embodiments, the vehicle has a ground clearance, and a ratio between the effective frame length of the frame of the track assembly and the ground clearance is between 2.6 and 3.5.

In some embodiments, the vehicle further includes a rotatable front axle and a front track assembly attached to the front axle, and the front track assembly has an effective frame height that is within 1 inch of the effective frame height of the track assembly that is attached to the rear axle.

For purposes of this application, terms related to spatial orientation such as forwardly, rearward, upwardly, downwardly, left, and right, are as they would normally be understood by a driver of the vehicle sitting on the driver seat of the vehicle in a normal riding position. Terms related to spatial orientation when describing or referring to components or sub-assemblies of the vehicle and of various components for the vehicle, separately from the vehicle should be understood as they would be understood when these components or sub-assemblies are mounted to the vehicle, unless specified otherwise in this application.

Additional and/or alternative features, aspects, and advantages of embodiments of the present technology will become apparent from the following description, the accompanying drawings, and the appended claims.

BRIEF DESCRIPTION OF THE DRAWINGS

The drawings included herewith are for illustrating various embodiments of articles, products, methods, and apparatuses described in the present specification. The drawings could not be to scale. Some features shown in the drawings could be exaggerated, or scaled down, relative to their possible "life" size(s), in order to make these features clearly visible in the drawings.

In the drawings:

FIG. 14 is a second perspective view of a second side of the two different clips of FIG. 13.

DETAILED DESCRIPTION

The headings in this section of the document are used solely to improve readability of the detailed description, and were not meant to be used for, and must not be used for, interpreting any of the information included in the detailed description. The headings do not separate the detailed description into sections, and the detailed description should be read and interpreted as though the headings in the detailed description do not exist.

Directions

Figure 1:
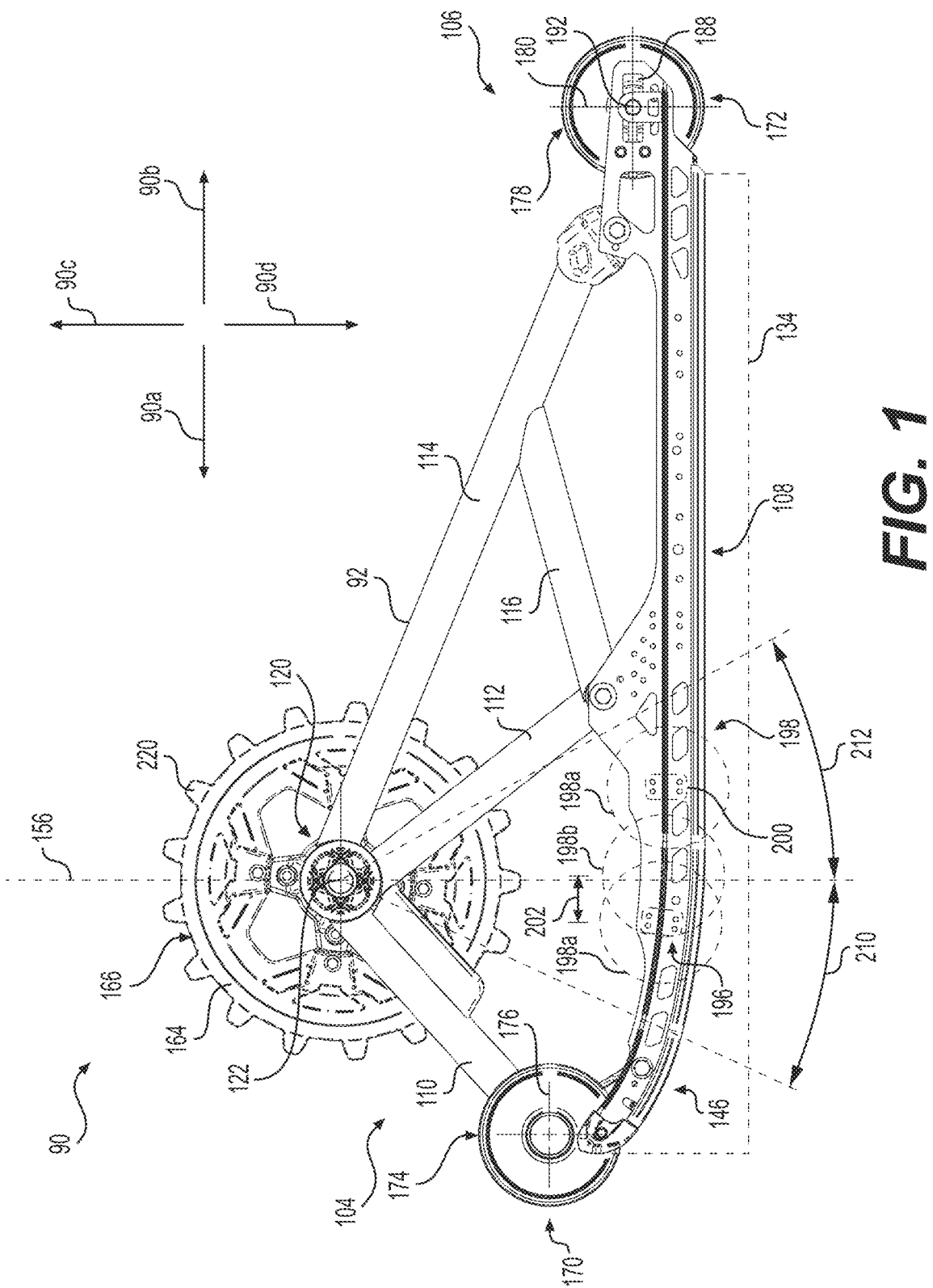
FIG. 1 is a left side view of a track assembly, according to a first embodiment.

With reference to FIG. 1, a forward direction, as the term is used in this document, is shown with reference numeral 90*a*. A rearward direction, as the term is used in this document, is shown with reference numeral 90*b*. An upward direction is shown with reference numeral 90*c*. A downward direction, as the term is used in this document, is shown with reference numeral 90*d*.

Figure 2:
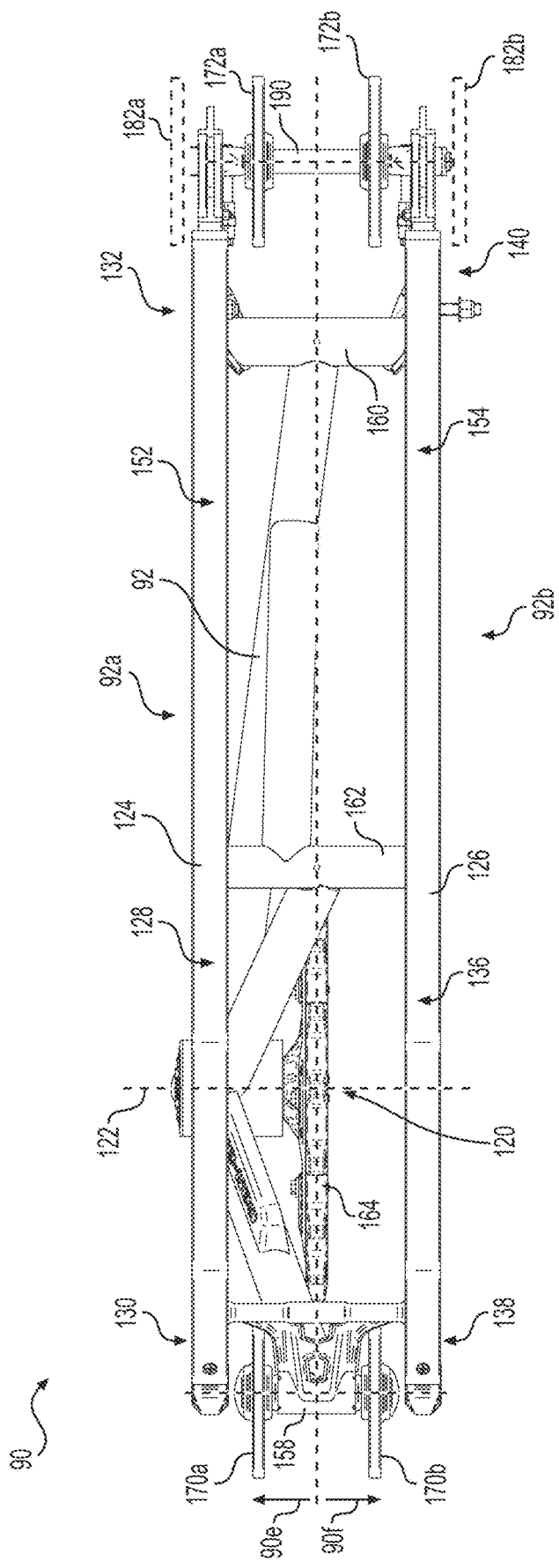
FIG. 2 is a bottom view of the track assembly of FIG. 1.

With reference to FIG. 2, a leftward direction, as the term is used in this document, is shown with reference numeral 90*e*. A rightward direction, as the term is used in this document, is shown with reference numeral 90*f*.

Track Assembly—General

FIGS. 1 to 4 show a track assembly 90 for a vehicle. The track assembly 90 has a frame 92. As shown in FIG. 2, the frame 92 has a left side 92*a*, a right side 92*b*, a front 104, a rear 106, and a bottom 108. The frame includes a plurality of frame members 110-116. The frame members 110-116 are welded to each other and are thus non-mobile relative to each other.

The frame 92 is suspensionless. It is contemplated that the frame 92 could include a suspension, such that, for example an upper part of the frame 92 would be sprung relative to a lower part of the frame 92 (not shown).

Figure 7:
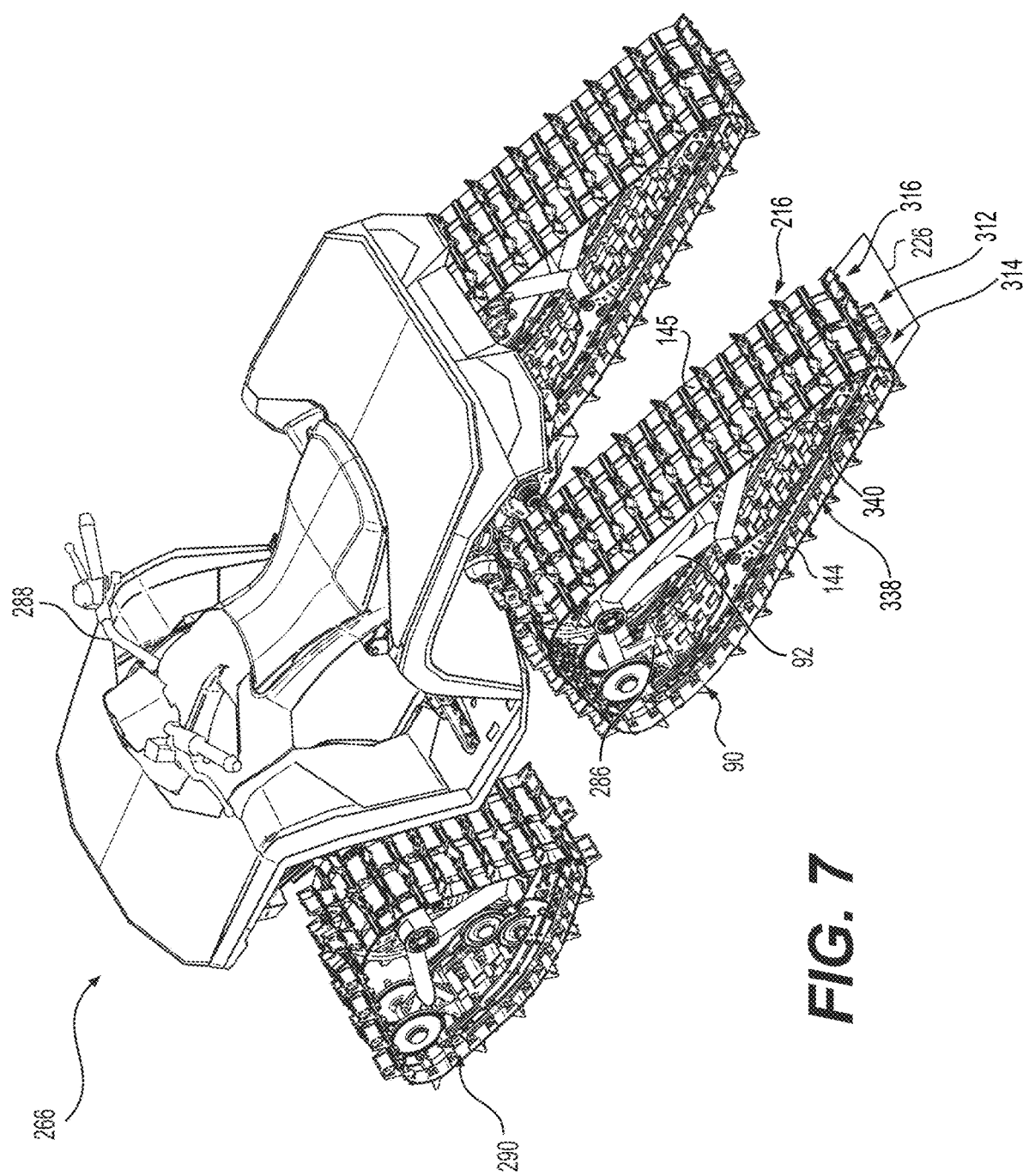
FIG. 7 is a perspective view of a vehicle with the track assembly of FIGS. 1 to 4 mounted onto a left side of the rear axle of the vehicle.
Figure 8:
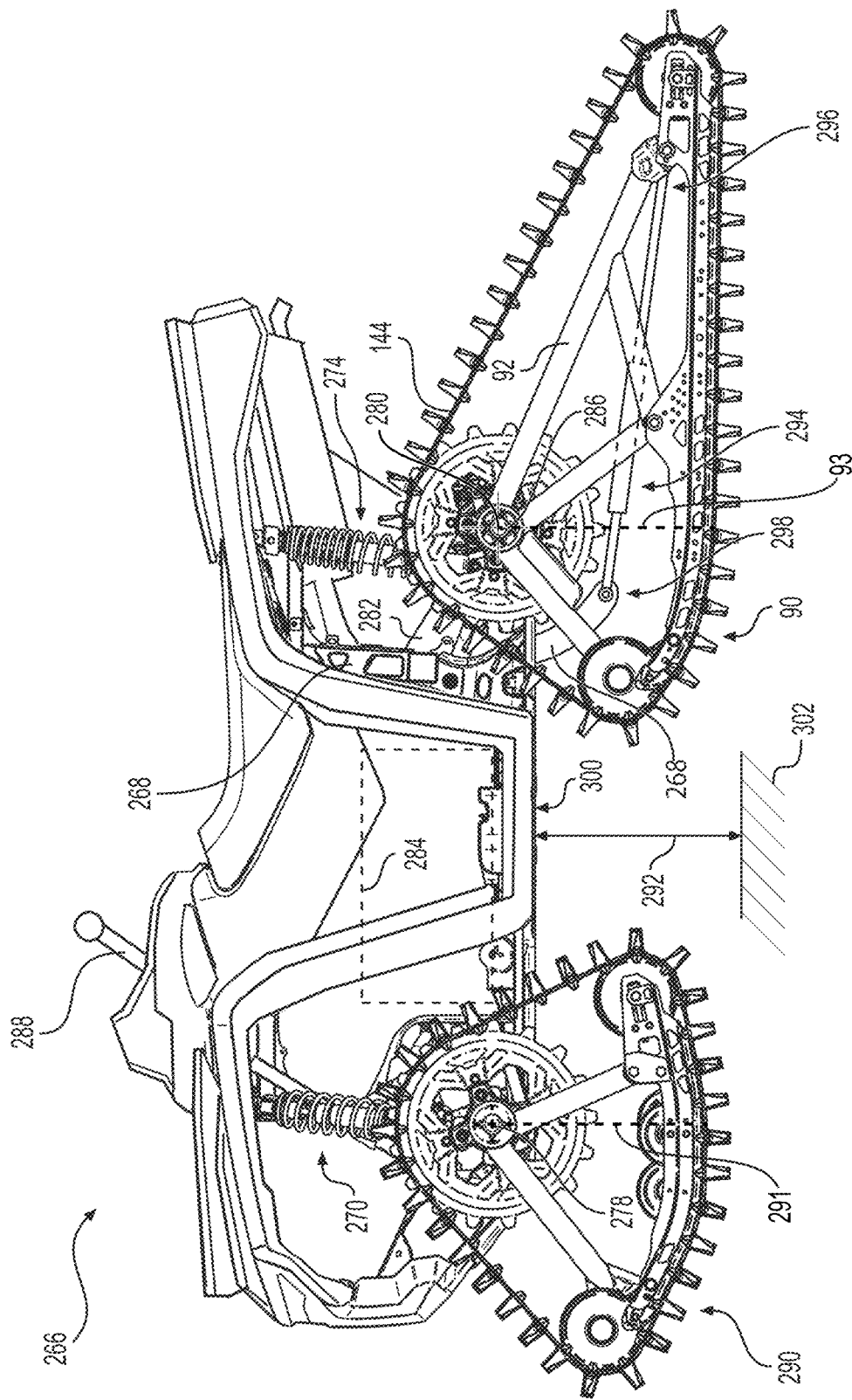
FIG. 8 is a side view of the vehicle of FIG. 7.

In this embodiment, a drive wheel 164 is rotatably secured on the frame 92 at a junction point of the frame members 110, 112, 114, to rotate about a drive wheel axis 122. The drive wheel 164 has a vehicle axle attachment portion 120 structured to allow the drive wheel 164 to be bolted to a wheel hub or other structure of a vehicle that is connected to an axle of the vehicle and which wheel hub or other structure normally receives a wheel of the vehicle. The drive wheel 164 is thus attachable to an axle of the vehicle instead of a wheel of that vehicle, co-axially with the drive wheel axis 122 and the axis of rotation of the wheel hub or other structure. The vehicle axle attachment portion 120 in this implementation has a plurality of apertures defined therethrough which match a bolt pattern of the wheel hub of a vehicle to which the drive wheel 164 is to be bolted. It is contemplated that any other suitable attachment of the drive wheel 164 to an axle of a vehicle could be used. An example of a vehicle axle and vehicle are shown in FIGS. 7 and 8, and are described in more detail later in this document. The non-mobile frame members 110-116 extend from the vehicle axle attachment portion 120 to slide rails 124, 126.

Slide Rails

The frame 92 has a longitudinally-extending left slide rail 124, which is connected to the frame members 110-116 at a the bottom 108 of the frame 92. The left slide rail 124 has a bottom surface 128, a front end 130, a rear end 132, and a length 134.

The frame 92 also has a longitudinally-extending right slide rail 126, which is connected to the frame members 110-116 at the bottom 108 of the frame 92. The right slide rail 126 has a bottom surface 136, a front end 138, a rear end 140, and a length (which in this example is equal to the length 134 of the left slide rail 124).

The bottom surface 128, 136 of each of the left and right slide rails 124, 126 is positioned such that it is supportable by a track 144 against terrain. As best shown in FIG. 1, in some embodiments, the bottom surface 128, 136 of each of the left and right slide rails 124, 126 is provided by a slide made of an ultra high molecular weight ("UHMW") polymer. In the present implementation, each of the slides is held on its corresponding slide rail 124, 126 by a conventionally known combination of T-slot and a screw. It is contemplated that the slides could be secured using a different suitable mechanism, including an adhesive. It is contemplated that the slides could be made integral with corresponding ones of the slide rails 124, 126. In some implementations, instead of having the slides, the bottom surfaces 128, 136 of the slide rails 124, 126 are coated with a low-friction material such as a UHMW polymer.

The front end 130, 138 of each slide rail 124, 126 is connected to a first one 110 of the plurality of frame members 110-116 of the frame 92, and the rear end 132, 140 of each slide rail is connected to a second one 114 of the plurality of frame members 110-116. The front end 130, 138 of each of the left and the right slide rails 124, 126 has an upward curvature 146. The upward curvature 146 of each of the left and the right slide rails 124, 126 has an upward radius of curvature 148.

The front end 130, 138 of each slide rail 124, 126 is connected to the first one 110 of the plurality of frame members 110-116 via a first transverse member 158, and the rear end 132, 140 of each slide rail 124, 126 is connected to the second one 114 of the plurality of frame members 110-116 via a second transverse member 160.

The frame member 112 is connected to the frame member 114 via the frame member 116. The frame members 110-116 are located between the left and the right slide rails 124, 126. The frame members 110-116 are located vertically between the left and the right slide rails 124, 126.

The slide rails 124, 126 are connected to a third one 112 of the plurality of frame members 110-116 via a third transverse member 162 at a point intermediate the front end 130, 138 and the rear end 132, 140 of the slide rails 124, 126.

The bottom surfaces 128, 136 of the slide rails 124, 126 include flat track supporting surfaces 152, 154 which extend rearward 90b from the upward curvature 146 of the front end 130, 138 toward the rear end 132, 140, and in some embodiments extend rearward 90b past the rear idler wheel assembly 172. The rear idler wheel assembly 172 is described later in this document.

Figure 3:
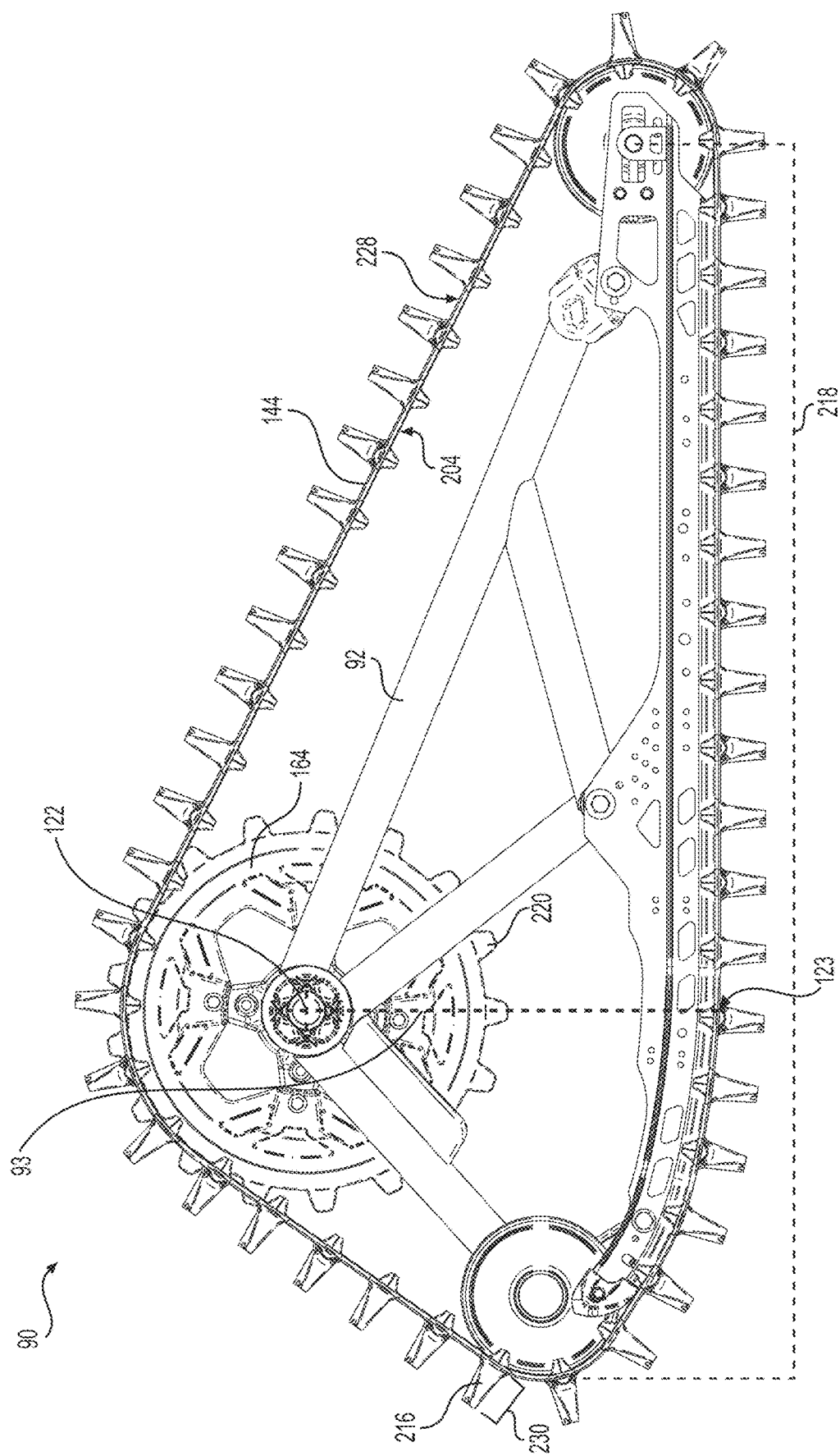
FIG. 3 is a left side view of the track assembly of FIG. 1, with a track mounted thereon.
Figure 4:
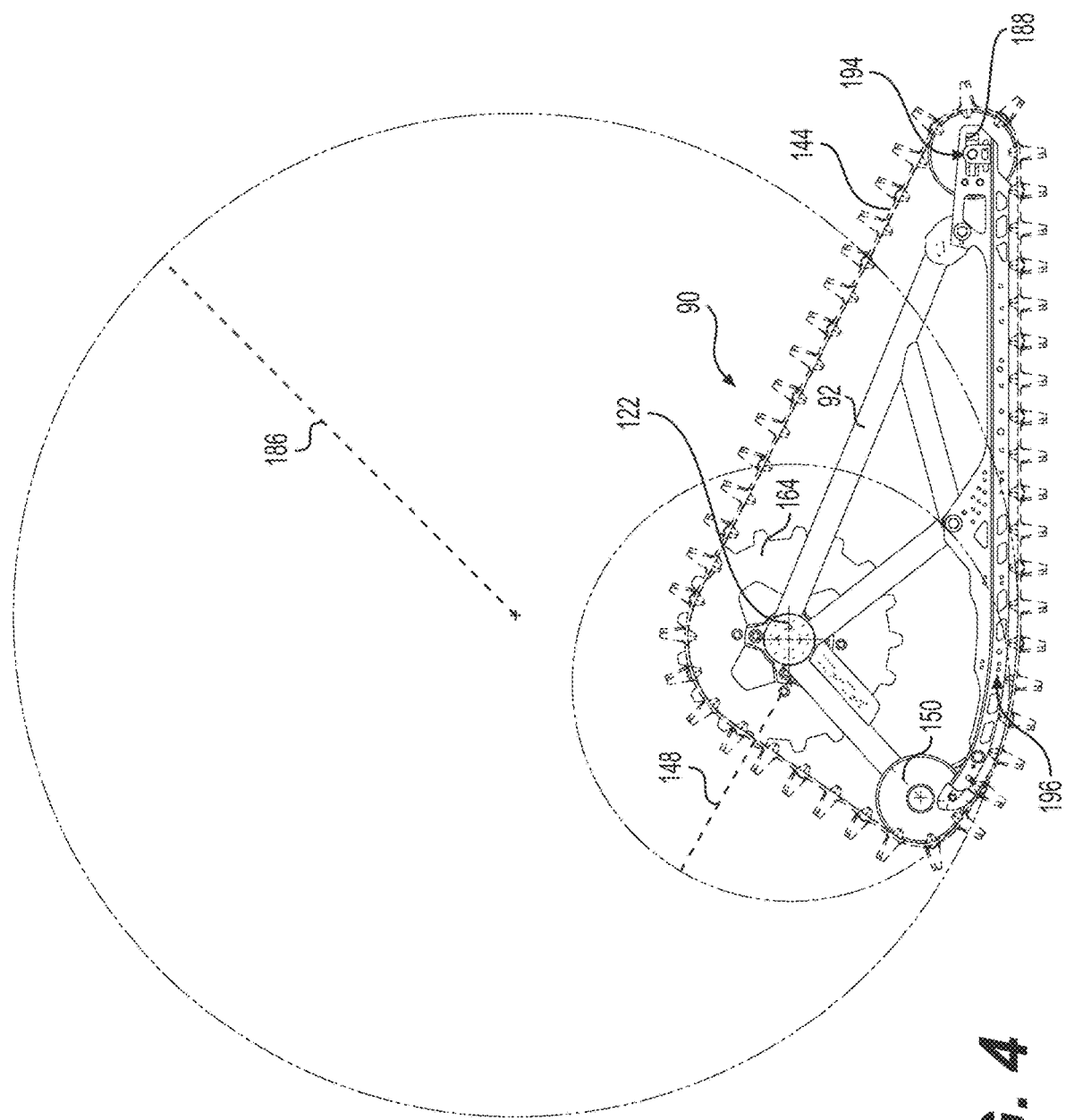
FIG. 4 is a left side view of the track assembly of FIG. 3, showing an effective wheel radius of the track assembly.

The flat track supporting surfaces 152, 154 are about 36.5 inches (927 millimeters) long. In some embodiments, the flat track supporting surfaces 152, 154 are between about 40 inches (1016 millimeters) and about 52 inches (1321 millimeters) long. It is contemplated that other lengths could be used. As best shown in FIGS. 1, 3 and 4, approximately two-thirds of the length 134 of each of the slide rails 124, 126 is positioned rearward 90b of a vertical transverse drive wheel plane 156.

It is contemplated that in other embodiments, the track assembly 90 need not have slide rails 124, 126, in which case standard known frames with mid-rollers (not shown) for driving the track 144 on terrain could be used.

Wheel Assemblies

The drive wheel 164 has a peripheral surface 166. The peripheral surface 166 of the drive wheel 164 extends upward 90c above the frame 92. The drive wheel axis 122 is positioned in a vertical transverse drive wheel plane 156.

The track assembly 90 has a front idler wheel assembly 170, and a rear idler wheel assembly 172. The forward idler wheel assembly 170 has a peripheral surface 174 and is connected to the frame 92 at the front of the frame 92 for rotation about a forward idler wheel axis 176 that is parallel to the drive wheel axis 122. It is contemplated that the forward idler wheel assembly 170 could be connected to the frame 92 for rotation about the forward idler wheel axis 176 by being rotationally connected to the slide rails 124, 126. The peripheral surface 174 extends forward 90a of the front ends 130, 138 of the slide rails 124, 126. The front idler wheel assembly 170 has two front idler wheels 170a, 170b. It is contemplated that the front idler wheel assembly 170 could have more than two wheels, or a single wheel.

The rear idler wheel assembly 172 has a peripheral surface 178. The rear idler wheel assembly 172 is connected to the frame 92, via the rear ends of the slide rails 124, 126, at the rear of the frame 92 for rotation about a rear idler wheel assembly axis 180 that is parallel to the drive wheel axis 122. It is contemplated that the rear idler wheel assembly 172 could be connected to the frame 92 for rotation about the rear idler wheel assembly axis 180 by being connected directly to the frame 92 instead of or in addition to being rotationally connected to the slide rails 124, 126. The peripheral surface 178 extends rearward of the rear ends 132, 140 of the slide rails 124, 126. The rear idler wheel assembly 172 has two idler wheels 172a, 172b. It is contemplated that the rear idler wheel assembly 172 could have more than two wheels, or a single wheel.

In a particular embodiment, the front idler wheel assembly 170 has two idler wheels 170a, 170b. The rear idler wheel assembly 172 has two idler wheels 172a, 172b. As shown with dashed lines in FIG. 2, in some implementations, the rear idler wheel assembly 172 has four idler wheels 172a, 172b, 182a, 182b (the two additional wheels 182a, 182b are shown in dashed lines). Four-wheeled versions of the rear idler wheel assembly 172 provide advantages in some applications.

As shown in FIG. 4, the front idler wheel assembly 170 has a front idler wheel assembly radius 150. Each of the upward curvatures 146 of the slide rails 124, 126 has an upward radius of curvature 148. In this embodiment, the upward radius of curvature 148 of the left slide rail 124 is equal to the upward radius of curvature 148 of the right slide rail 126.

The upward radii of curvature 148 of the slide rails 124, 126 and the front idler wheel assembly radius 150 are sized such that the track 144 bends around the front idler wheel assembly 170 and the upward curvatures 146 about an effective wheel radius 186, and the effective wheel radius 186 is greater than each of the front idler wheel assembly radius 150 and the upward radii of curvature 148.

Tensioner Assembly

The slide rails 124, 126 have transversely aligned tensioner apertures 188 that extend longitudinally in the respective slide rails 124, 126. The rear idler wheel assembly 172 is mounted onto a rearward axle 190 via known ball bearings (not shown). The rearward axle 190 is slidably mounted to the apertures 188 via a known bolt (not shown, received inside the rearward axle 190) and nut combination 192. The rearward axle 190, and the bolt and nut combination 192 may be collectively referred to as a tensioner assembly 194.

The tensioner assembly 194 is configured such that when the nut is loosened, the tensioner assembly 194 is slidable along the length of the apertures 188, and such that when the nut is tightened, the tensioner assembly 194 is fixed in a position in the apertures 188. The rear idler wheel assembly 172 is thus selectively movable between a plurality of longitudinally-distributed tension positions to tension a track 144 that may be supported by the track assembly 90.

The tensioner assembly 194 is a known mechanism. It is contemplated that any other suitable tensioner assembly could be used. It is contemplated that the forward idler wheel assembly 170 could be implemented, instead of or in addition to the rear idler wheel assembly 172, with a suitable tensioner assembly such that forward idler wheel assembly 170 would be movable between a plurality of longitudinally-distributed tension positions to tension the track 144.

Mid-Rollers

In this embodiment, the track assembly 90 excludes wheels (i.e. has no wheels) between the front end 130 and the rear end 132 of the left slide rail 124, and excludes wheels (i.e. has no wheels) between the front end 138 and the rear end 140 of the right slide rail 126. The wheels of the front idler wheel assembly 170 and the rear idler wheel assembly 172, and the drive wheel 164 are the sole wheels of the track assembly 90 contacting the track 144. This configuration provides for improved slide durability in some applications.

Each of the slide rails 124, 126 has a plurality of mid-roller support apertures 196 distributed along its length. The mid-roller support apertures 196 are arranged to receive one or more wheels (which will be referred to as "mid-rollers 198", shown in dashed lines in FIG. 1) in at least one position on the slide rails 124, 126. An example set of positions of the mid-rollers 198 is shown in FIG. 1.

In this embodiment, the apertures 196 are configured to receive wheel mounting brackets 200 (could be any suitable wheel mounting brackets) with one or more mid-rollers 198 rotationally attached to each of the mounting brackets 200. In this embodiment, each wheel mounting bracket 200 has one mid-roller 198 rotationally attached thereto.

The mid-roller support apertures 196 on the left side rail 124 are longitudinally offset from the mid-roller support apertures 196 on the right side rail 126, as shown with reference arrow 202, such that when mid-rollers 198 are mounted to these apertures 196 (in this example, via the brackets 200), the mid-roller(s) 198 on the left side rail 124 are longitudinally offset from the mid-roller(s) 198 on the right side rail 126.

The longitudinal offset of the mid-rollers 198 reduces vibration experienced by the track assembly 90 when the track assembly 90 is in use, in some applications. It is contemplated that in some embodiments, the slide rails 124, 126 could be configured to receive mid-rollers 198 that would be longitudinally aligned relative to each other when rotationally mounted to the slide rails 124, 126.

As shown in FIG. 1, the mid-roller support apertures 196 are positioned to support two mid-rollers 198*a* on the left side rail 124, and one mid-roller 198*b* on the right side rail 126. It is contemplated that a different combination, longitudinal offset, and number (including zero) of mid-rollers 198 could be used, depending on the application of the track assembly 90 and the particular track 144 used with the track assembly 90.

For example, there could be pairs of longitudinally-aligned mid-roller support apertures 196 in the slide rails 124, 126. Each of the pairs could be sized to receive an axle with one or more mid-rollers 198 thereon, and could be positioned to provide suitable protrusion(s) of the mid-roller(s) 198 below the bottom surfaces 128, 136 of the slide rails 124, 126. It is contemplated that different numbers and different combinations of positions of mid-roller support apertures 196 could be used.

In other words, the mid-roller support apertures 196 are wheel attachment features. In an aspect, in some cases the mid-roller support apertures 196 allow users of the track assembly 90 to reconfigure the track assembly 90 by adding one or more mid-rollers 198 to adapt the track assembly 90 to different types of terrain and other riding conditions.

It is contemplated that any other suitable mechanism for mounting mid-rollers 198 to the slide rails 124, 126 could be used. For example, the system disclosed in the commonly owned U.S. Pat. No. 8,240,782, entitled "Track assembly", issued Aug. 14, 2012, could be used. U.S. Pat. No. 8,240,782 is hereby incorporated herein by reference in its entirety.

The track assembly 90 is operable without any mid-rollers 198 in at least some applications. Thus, it is contemplated that the slide rails 124, 126 could have no apertures or other wheel attachment features that would be configured to receive mid-rollers 198.

In some embodiments of the track assembly 90 that include mid-rollers 198, the mid-rollers 198 are sized and positioned to protrude below the bottom surfaces 128, 136 of the slide rails 124, 126 to roll against an inner surface 204 of the track 144. In some such embodiments, the mid-rollers 198 are positioned relative to the left slide rail 124 and the right slide rail 126 to extend downward past the bottom surface of each of the slide rails 124, 126 by 2/25.4 inches (2 millimetres).

It is contemplated that mid-rollers 198, when present, could be positioned relative to the slide rails 124, 126 to extend downward past the bottom surfaces 128, 136 of the slide rails 124, 126 by a distance that is in a range of 2/25.4 inches to 6/25.4 inches (2 millimetres to 6 millimetres, respectively). Such ranges of protrusion below the bottom surfaces 128, 136 of the slide rails 124, 126 provide improved slide durability in some applications.

In some embodiments of the track assembly 90 that include mid-rollers 198, and as shown in FIG. 1, the mid-rollers 198 are positioned relative to the slide rails 124, 126 within 20 degrees away from (in either direction) the vertical transverse drive wheel plane 156 starting from the drive wheel axis 122 in a downward 90*d* direction along said plane 156 (see reference arrows 210, 212 in FIG. 1). Such positioning of mid-roller(s) 198 improves performance of the track assembly 90 in some applications.

Track and Track Assembly Length

As shown in FIGS. 3-4 and 7-8, a track 144 is supported around the drive wheel 164, the forward and rear idler wheel assemblies 170, 172, and the bottom surfaces 128, 136 of the slide rails 124, 126. The track 144 is suitably tensioned by adjustment of the tensioner assembly 194 via known tensioning methods.

As shown in FIG. 3, the track assembly 90 has an effective frame length 218, measured as a horizontal distance between a foremost point on the outer surface of the track 144 (from which outer surface extend the traction lugs 216) and the rear idler wheel assembly axis 180, as shown in FIG. 3. In the present implementation, the effective frame length 218 is 48 inches (1219.2 millimeters). In other implementations, the frame 92 is structured such that the effective frame length 218 is between 48 inches (1219.2 millimeters) and 60 inches (1524 millimeters).

The frame 92 also has an effective frame height 93, defined as a vertical distance between the drive wheel axis 122 and a point 123 on the outer surface of the track 144 (from which outer surface extend the traction lugs 216), the point 123 being positioned directly below the drive wheel axis 122. In the present implementation, the effective frame height 93 is 19 inches (482.6 millimeters). In other implementations, the frame 92 is structured such that the effective frame height 93 is between 17 inches (431.8 millimeters) and 20 inches (508 millimeters).

It has been found by the creators of the present technology that combinations of the effective frame length 218 and the effective frame height 93 in which the effective frame length 218 and the effective frame height 93 are in the abovementioned ranges, respectively, provide performance improvements in some driving conditions, including some deep snow driving conditions. For example, it has been found that in some deep snow driving conditions, such as in some soft deep snow of three to five feet deep, the effective frame height 93 reduces an amount of snow drag on the vehicle with which the track assembly 90 is used, while the effective frame length 218 provides floatation and increased traction performance.

The track 144 is in driving engagement with the drive wheel 164. In this embodiment, the drive wheel 164 is a drive sprocket 164 that has circumferentially-positioned teeth 220 that extend away from the drive wheel 164, and the track 144 has a plurality of drive apertures 222. The drive apertures 222 are positioned in the track 144 to receive the teeth 220 of the drive sprocket 164 as the drive sprocket 164 rotates the track 144. As shown, the drive apertures 222 are longitudinally distributed along the track 144 and are positioned between adjacent ones of the traction lugs 216 that are in a center row 312 of traction lugs 216.

The drive wheel 164, the front idler wheel assembly 170, the rear idler wheel assembly 172, and the bottom surfaces 128, 136 of the slide rails 124, 126 define a track perimeter. The track perimeter is about 138 inches (3505.2 millimetres). In some embodiments, the track perimeter is between 130 inches (3302 millimetres) and 150 inches (3810 millimetres). In some embodiments, the track perimeter is between 135 inches (3429 millimetres) and 180 inches (4572 millimetres).

Figure 5:
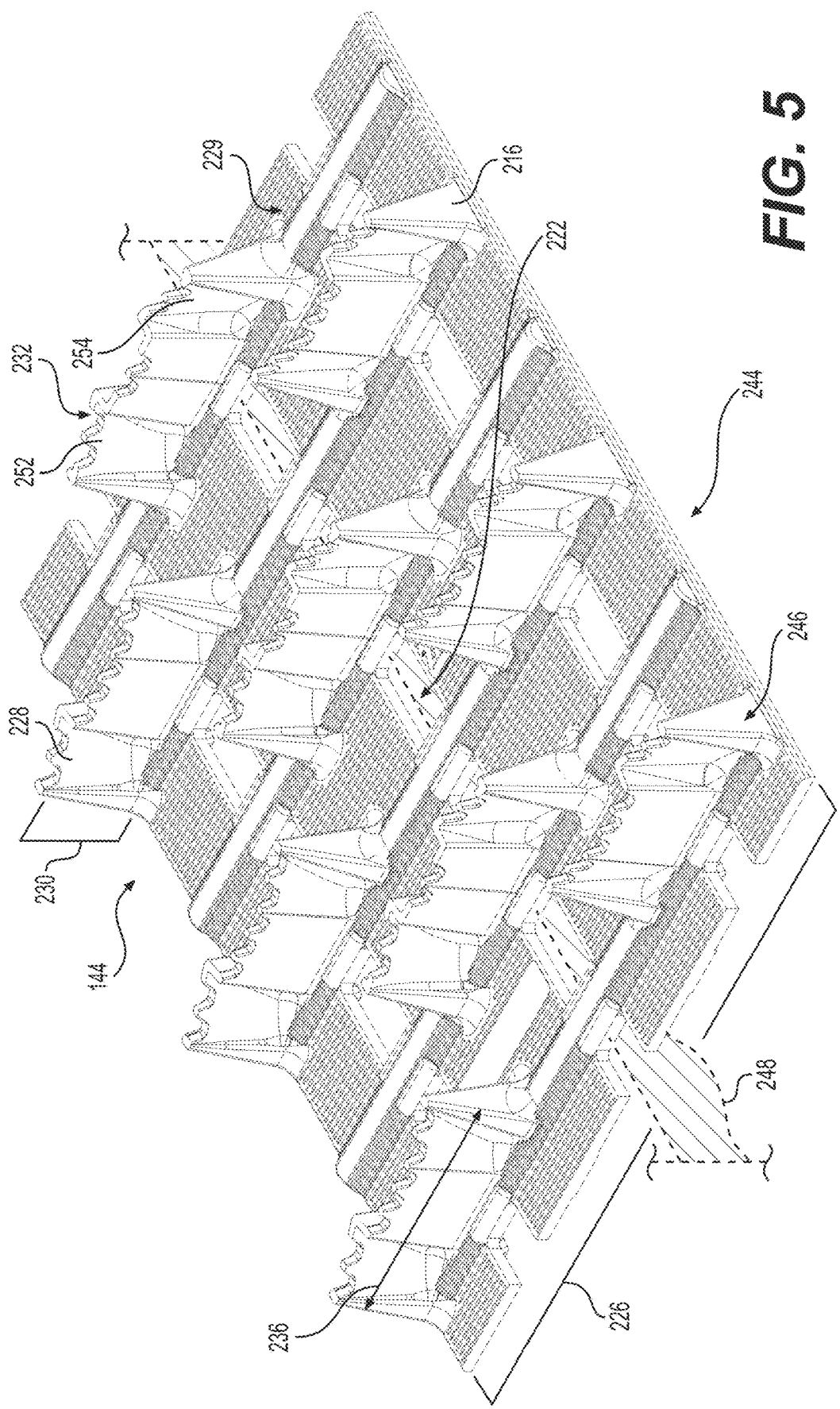
FIG. 5 is a perspective view of a portion of the track of FIGS. 3 and 4.

As shown in FIGS. 5 and 7, the track 144 has a width 226, which in this embodiment is 14 inches (355.6 millimetres). In some embodiments, the track 144 has a width 226 that is between 13 inches (330.2 millimetres) and 15.5 inches (393.7 millimetres). It is contemplated that other widths 226 could be used, depending on each particular embodiment of the track assembly 90.

Traction Lug Materials, Hardness and Height

The track 144 has a plurality of traction lugs 216 extending outwardly from an outer surface 228 of the track 144. The traction lugs 216 are distributed longitudinally on the outer surface 228 of the track 144, as shown in FIG. 5.

The track 144 and the traction lugs 216 are made of an elastomeric material. In this embodiment, each of the traction lugs 216 has a hardness in a range of 70 to 95 shore A, and is made from natural rubber. It is contemplated that the traction lugs 216 could be made from a different material, such as a synthetic rubber, and could be made to have a different hardness.

Figure 6:
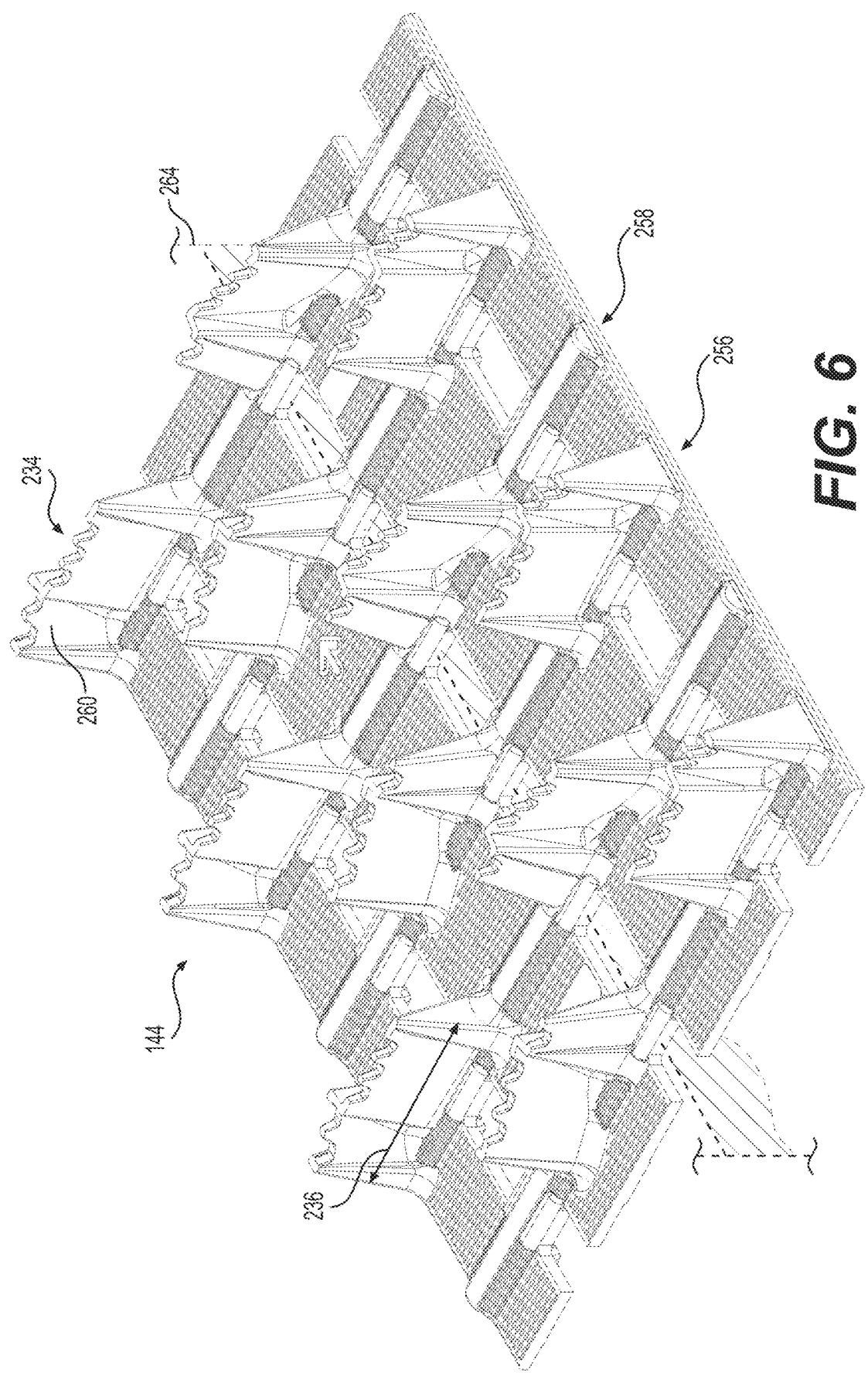
FIG. 6 is a perspective view of a portion of the track of FIG. 5, according to another embodiment.

Each of the traction lugs 216 has a lug height 230. The lug height 230 of each traction lug 216 is an average height of that traction lug 216. As shown in FIG. 5, the traction lugs 216 of a given track 144 may have one or more groove patterns 232. A first groove pattern 232 is shown in FIG. 5. A second groove pattern 234, of an alternate embodiment of the track 144, is shown in FIG. 6.

In the embodiment of FIG. 5, each of the traction lugs 216 has a lug height 230 of 2 inches (50.8 millimeters). In some embodiments, the traction lugs 216 have a lug height 230 that is in a range of 1.37 inches (44.4 millimeters) to 2.5 inches (63.5 millimeters).

Traction lugs 216 of the track 144 could have one and the same lug height 230, or could include a plurality of different lug heights 230, the lug heights 230 being in one of the above ranges.

Traction Lug Length

As best shown in FIG. 5, each traction lug 216 has a lug length 236 of approximately one-third of the width 226 of the track 144 and the traction lugs 216 in the center row 312 are slightly longer than the traction lugs 216 in the two side rows 314, 316. In some implementations, the traction lugs 216 in the center row 312 have the same lug length 236 as the traction lugs 216 in the two side rows 314, 316. In the embodiment of the track 144 shown in FIG. 6, each traction lug 216 has a lug length 236 of approximately one-quarter of the width 226 of the track 144. In this embodiment (FIG. 6), the traction lugs 216 all have one and the same lug length 236. In some embodiments of the track 144, the traction lugs 216 have different relative lug lengths 236.

Traction Lug Patterns

The traction lugs 216 in each of the three longitudinal rows of traction lugs shown in FIG. 5 are longitudinally spaced from each other by 6 inches (152.4 millimetres). It is contemplated the traction lugs 216 in each of the three longitudinal rows of traction lugs could be longitudinally spaced from each other by 5 to 8 inches (i.e. a traction lug 216 may be longitudinally spaced from a longitudinally adjacent traction lug 216 by 5 to 8 inches) (127 millimetres to 203.2 millimetres, respectively). Such longitudinal spacing provides improved performance in some driving conditions. In the embodiment shown in FIG. 5, each traction lug 216 in each of the three longitudinal rows of traction lugs 216 is longitudinally offset by 3 inches (76.2 millimetres) from each adjacent traction lug in the adjacent longitudinal row(s) of traction lugs 216. This spacing is referred to as pitch. That is, in the embodiment of FIG. 5, the pitch is 3 inches 3 inches (76.2 millimetres).

In some embodiments, the track 144 has traction lugs 216 with a combination of different longitudinal spacings (pitch) in each given longitudinal row of traction lugs, the different longitudinal spacings (pitch) being within the range of 5 to 8 inches (127 millimetres to 203.2 millimetres, respectively) in some such embodiments.

The traction lugs 216 of the track 144 of FIG. 5 are in a 2-1 repeating pattern (a row 244 of lugs having one traction lug 216 is followed by a row 246 of lugs having two traction lugs 216). The traction lugs 216 are substantially perpendicular to a longitudinal vertical center plane 248 of the track 144. In other embodiments, the traction lugs 216 of the track 144 have different patterns.

In this embodiment, each traction lug 216 in one sub-plurality of traction lugs 216 has one angled portion 229, the angled portion 229 being angled relative to the longitudinal vertical center plane 248. Each traction lug 216 in another sub-plurality of traction lugs 216 has two angled portions 252, 254, the angled portions 252, 254 being angled relative to the longitudinal vertical center plane 248, and being substantially symmetrically positioned about longitudinal vertical center plane 248.

In the embodiment of the track 144 of FIG. 6, the traction lugs 216 are arranged in a 2-2 repeating pattern (a first row 256 of traction lugs 216 having two traction lugs 216 is followed by a second row 258 of traction lugs 216 having two traction lugs 216). Each of the traction lugs 216 has an angled portion 260. The angled portion 260 is angled relative to a longitudinal vertical center plane 264 of the track 144. In some embodiments, the track shown in FIG. 6 is used on front track assemblies and the track shown in FIG. 5 is used on rear track assemblies. This provides performance advantages in some applications and driving conditions.

The various configurations of the track 144 described in this document provide performance advantages in some applications. The various described configurations of the track 144 in combination with the effective frame length 218 of the track assembly 90 when the effective frame length 218 is in the range described herein above provide performance advantages in some applications. The patterns of the traction lugs 216 and the various implementations of construction of the track 144 described herein are not limited to being used to the track assembly described herein and could be used with other track assemblies.

Perpendicular Entry of Traction Lugs into Snow

In some embodiments, the drive wheel 164, the front idler wheel assembly 170, the rear idler wheel assembly 172, the bottom surfaces 128, 136 of the left and right slide rails 124, 126, and the track 144 are sized and positioned relative to each other such that when the track assembly is mounted to a vehicle, such as an All Terrain Vehicle ("ATV"), the following operation occurs.

When the vehicle is traveling forward 90a on flat level surface terrain (not shown) covered with snow, and the track 144 is being driven by the drive wheel 164 about a path around the drive wheel 164, the front idler wheel assembly 170, the left and right slide rails 124, 126, and the rear idler wheel assembly 172, the traction lugs 216 of the track 144 enter the snow substantially perpendicular to flat level surface terrain. The traction lugs 216 remain substantially perpendicular to the flat level surface terrain as the track 144 travels about the path at least until the traction lugs 216 begin (i.e. each traction lug 216 begins) to exit the snow.

Clips and Reinforcing Rods

Figure 9:
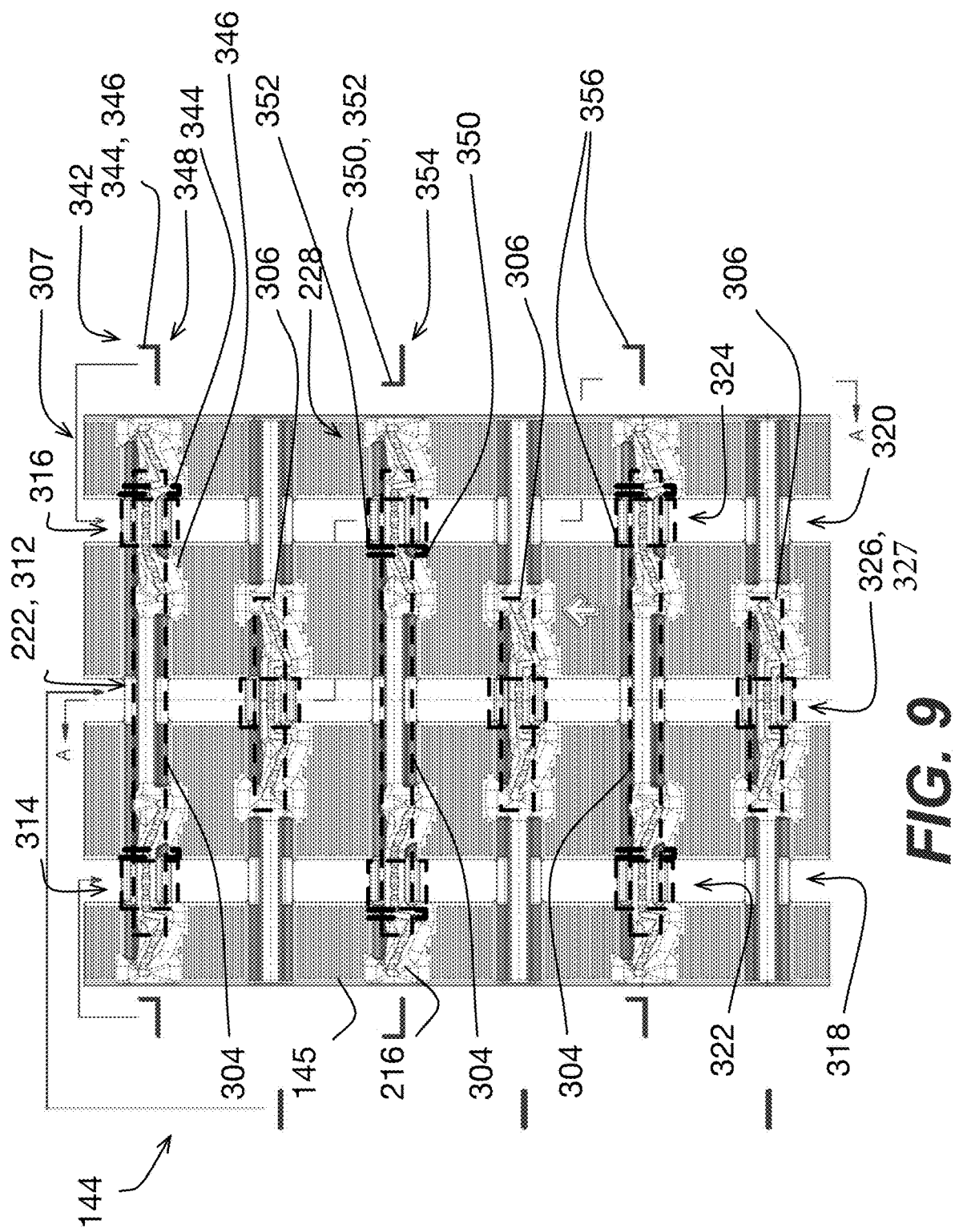
FIG. 9 is a top plan view of an outer surface of the portion of the track of FIG. 5.

Now referring to FIGS. 9 to 12, the track 144 shown in FIGS. 3 to 5 and 7 and 8 is shown in more detail. As schematically shown in FIG. 9, the track 144 has an endless belt portion 145 that defines the outer surface 228 of the track 144, a plurality of longer transverse reinforcement rods 304 distributed through the track 144/endless belt portion 145, and a plurality of shorter transverse reinforcement rods 306 distributed through the track 144/endless belt portion 145. In this implementation, the shorter transverse reinforcement rods 306 are shorter in length than the longer transverse reinforcement rods 304 and are all of one and the same length. It is contemplated that the shorter transverse reinforcement rods 306 need not be all of one and the same length. Similarly, in this implementation, the longer transverse reinforcement rods 304 are all of one and the same length. It is contemplated that the longer transverse reinforcement rods 304 need not be all of one and the same length.

As schematically shown in FIG. 9, each of the shorter transverse reinforcement rods 306 is aligned along its length with a corresponding one of the traction lugs 216 that are in the center row 312 of the traction lugs 216, and is slightly shorter than its corresponding traction lug 216. This alignment of each of the shorter transverse reinforcement rods 306 with a corresponding traction lug 216 in the center row 312 helps reduce torsion of the corresponding traction lug 216 when the track 144 is driven over some types of terrain. In this implementation, the length of each of the shorter transverse reinforcement rods 306 is about 90% of the length 236 of its corresponding traction lug 216. It is contemplated that a different length ratio could be used.

Both the shorter transverse reinforcement rods 306 and the longer transverse reinforcement rods 304 are disposed inside the track 144/endless belt portion 145 and are fully covered in the rubber of the endless belt portion 145. It is contemplated that a different construction could be used. As schematically shown in FIG. 9, shorter transverse reinforcement rods 306 and the longer transverse reinforcement rods 304 alternate along the length of the track 144. That is, each of the shorter transverse reinforcement rods 306 is neighbored by two adjacent longer transverse reinforcement rods 304, and vice versa. As shown in FIG. 9, the present implementation, the longer transverse reinforcement rods 304 alternate with the shorter transverse reinforcement rods 306 in a long-short-long-short pattern 307. It is contemplated that a different arrangement could be used, depending on the particular layout of the traction lugs 216 for example.

As schematically shown in FIG. 9, in this implementation each of the longer transverse reinforcement rods 304 is aligned along a part of its length at one of its ends with a corresponding one of the traction lugs 216 that are in the left side row 314 of the traction lugs 216, and along a part of its length at its other end with a corresponding one of the traction lugs 216 that are in the right side row 316 of the traction lugs 216. This alignment of each of the longer transverse reinforcement rods 304 with corresponding traction lugs 216 in the side rows 314, 316 helps reduce torsion of the corresponding traction lugs 216 when the track 144 is driven over some types of terrain. The alignment of the longer transverse reinforcement rods 304 and the shorter transverse reinforcement rods 306 relative to the track 144 and the traction lugs 216 is shown in the cross-section in FIG. 10, the cross-section being taken along the section line A-A of FIG. 9.

Figure 11:
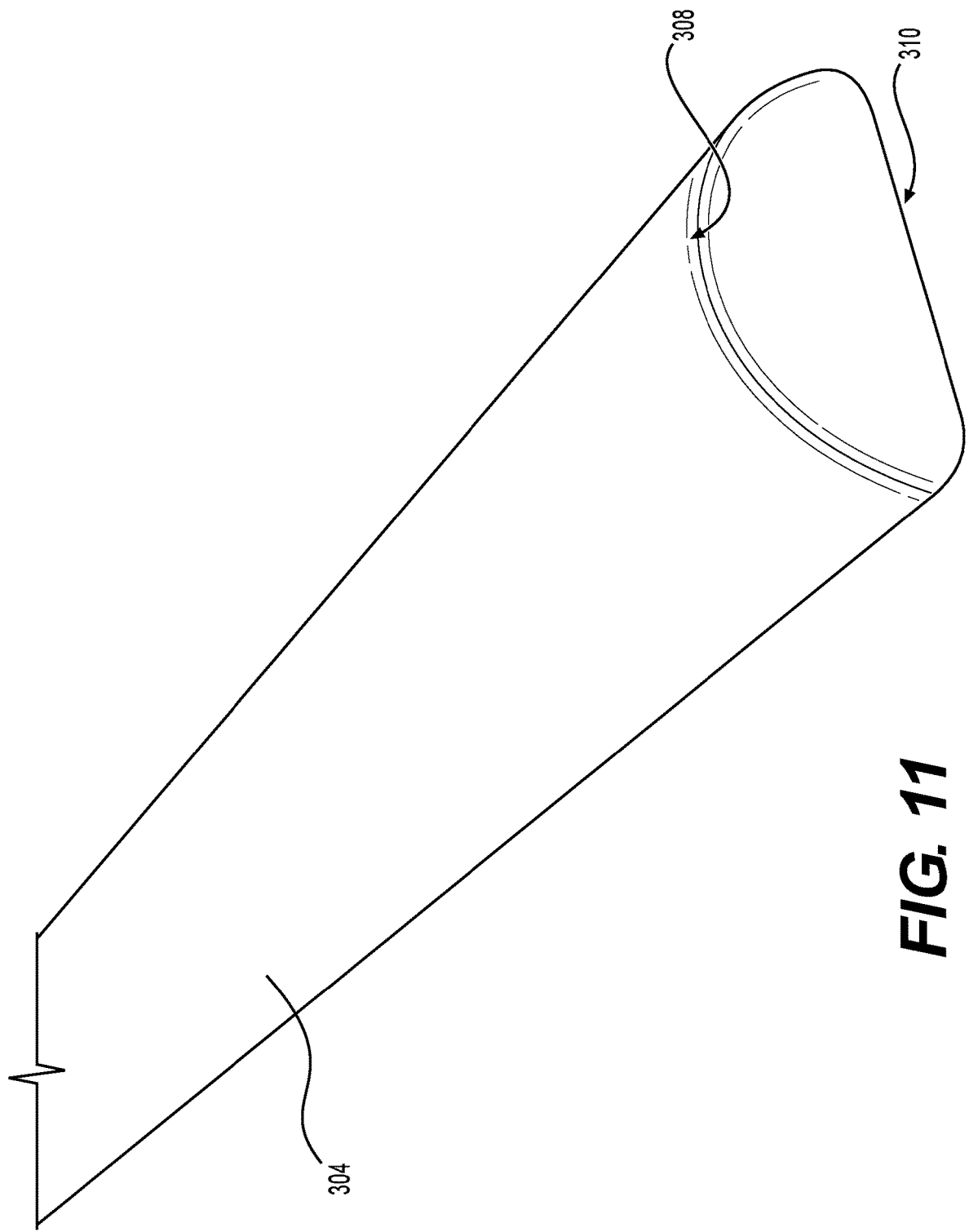
FIG. 11 is a close-up perspective view of a transverse reinforcement member of the track of FIG. 5.
Figure 12:
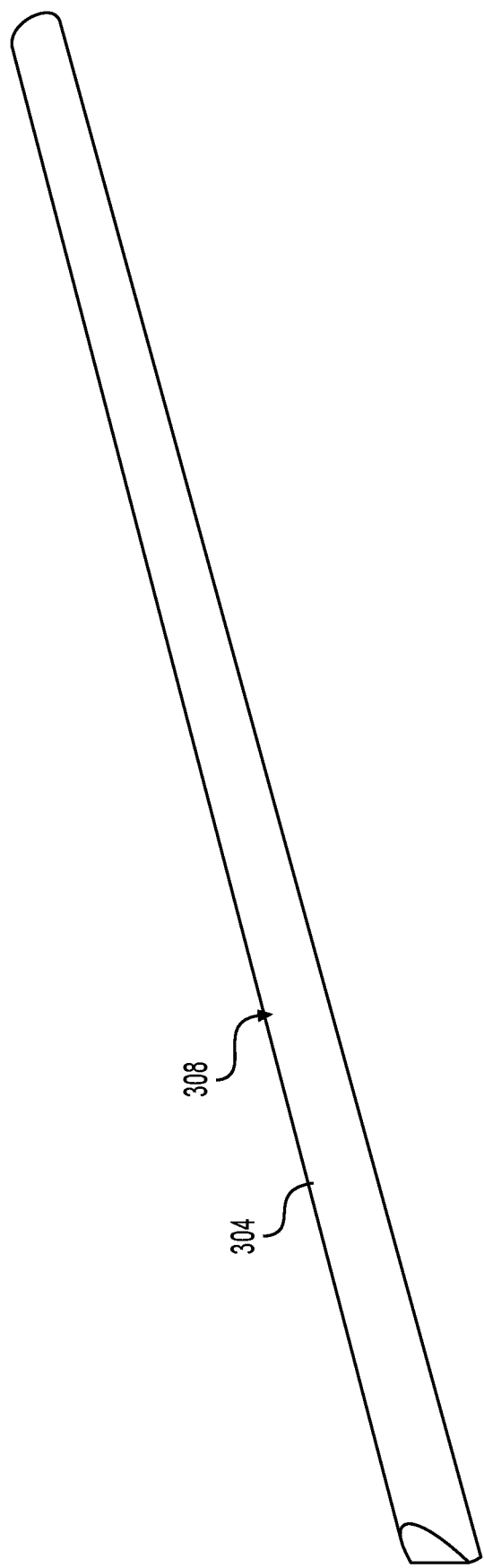
FIG. 12 is a different perspective view of the reinforcement member of the track of FIG. 11.

FIG. 11 shows a close-up perspective view of one of the longer transverse reinforcement rods 304, taken out of the track 144. As shown, in this implementation, each of the longer transverse reinforcement rods 304 is an elongate fiberglass rod that has a cross-section in the shape of the letter "D", with an arcuate surface 308 on its one side and a flat surface 310 opposite the arcuate surface 308. It is contemplated that the longer transverse reinforcement rods 304 could be made from a different material(s) and/or could have a different cross-section(s). FIG. 12 shows another perspective view of the one of the longer transverse reinforcement rods 304. In this implementation, each of the shorter transverse reinforcement rods 306 is also an elongate fiberglass rod and has the same cross-section and shape as the longer transverse reinforcement rods 304. It is contemplated that the shorter transverse reinforcement rods 306 could be made from a different material(s) and/or could have a different cross-section(s).

As shown in FIGS. 5 and 9, in addition to the drive apertures 222, the track 144 has two side rows 318, 320 of apertures defined therethrough. Each of the two side rows 318, 320 of apertures in this implementation is similar in shape and positioning to the drive apertures 222, but it is contemplated that a different arrangement could be used. As schematically shown in FIG. 9, a first plurality of L-shaped clips 322 is mounted to the track 144, each of the clips 322 being mounted onto the rubber of the endless belt portion 145 over one end of each of the longer transverse reinforcement rods 304 on the left side of the track 144. Each of the clips 322 on the left side of the track 144 passes between the left slide rail 124 and the track 144 when the track 144 is mounted onto the track assembly 90 and when that track 144 is driven, with each revolution of the track 144 around the frame 92 of the track assembly 90. The clips 322 on the left side of the track 144 help reduce friction between the track 144 and the left slide rail 124 when the track assembly 90 is in use.

A second plurality of L-shaped clips 324 is mounted to the track 144, each of the clips 324 being mounted onto the rubber of the endless belt portion 145 over the other end of each of the longer transverse reinforcement rods 304 on the right side of the track 144. Each of the clips 324 on the right side of the track 144 passes between the right slide rail 126 and the track 144 when the track 144 is mounted onto the track assembly 90 and when that track 144 is driven, with each revolution of the track 144 around the frame 92 of the track assembly 90. The clips 324 on the right side of the track 144 help reduce friction between the track 144 and the right slide rail 126 when the track assembly 90 is in use.

A third plurality of C-shaped clips 326 is mounted to the track 144, each of the clips 326 being mounted onto the rubber of the endless belt portion 145 over a middle portion of each of the shorter transverse reinforcement rods 306. Each of the clips 326 passes between the drive sprocket 164 and the track 144 when the track 144 is mounted onto the track assembly 90 and when that track 144 is driven, with each revolution of the track 144 around the frame 92 of the track assembly 90. As shown, the clips 326 are mounted over the shorter transverse reinforcement rods 306 only, and not over the longer transverse reinforcement rods 304, providing a clip-rod-clip pattern 327 as schematically shown in FIG. 9. As a result, when the track 144 is driven, the drive sprocket 164 rolls over one of the centrally-placed clips 326, then over the inner surface 340 of the track 144 over one of the longer transverse reinforcement rods 304 neighboring that clip 326 in the direction of rotation of the drive sprocket 164, then over a subsequent one of centrally-placed clips 326 in the same direction, the again over the inner surface 340 of the track 144 over a subsequent one of the longer transverse reinforcement rods 304 in the same direction, and so on. The clips 326 help reduce friction between the drive sprocket 164 and the track 144 when the track assembly 90 is in use. The clip-rod-clip pattern 327 also helps reduce manufacturing costs of the track 144 in some applications without materially affecting wear rates of the track 144.

Figure 10:
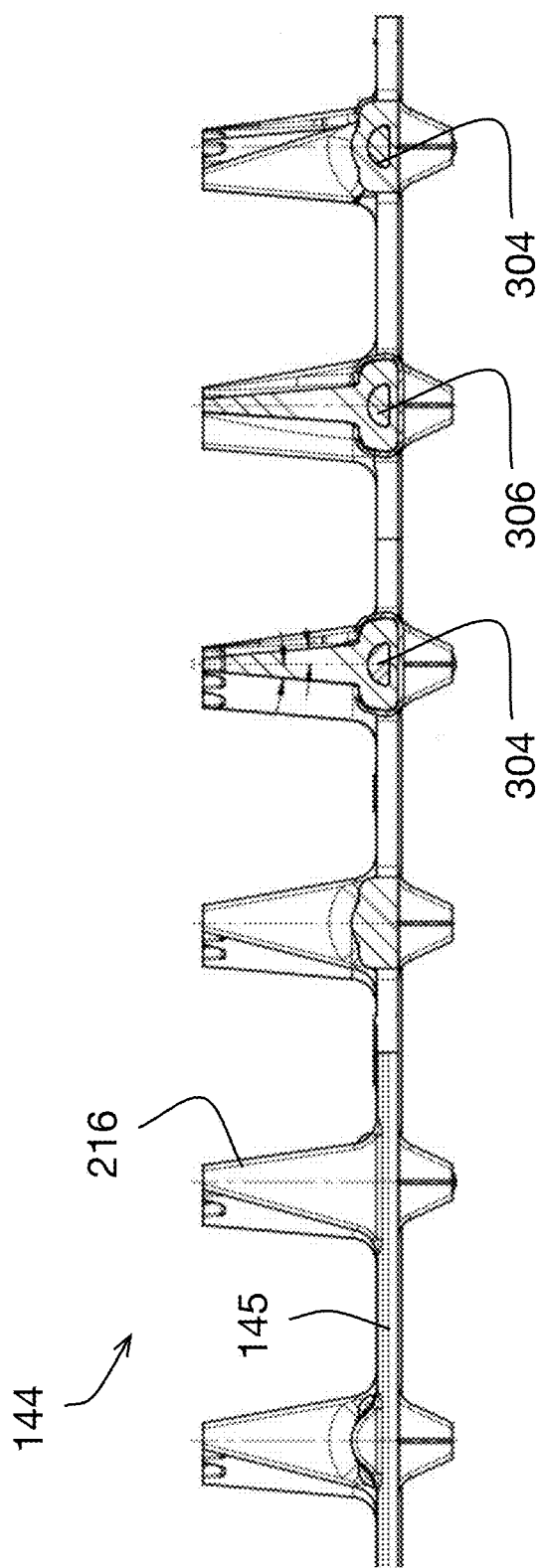
FIG. 10 is a cross-section of the part of the track of FIG. 9, taken along line A-A of FIG. 9.
Figure 13:
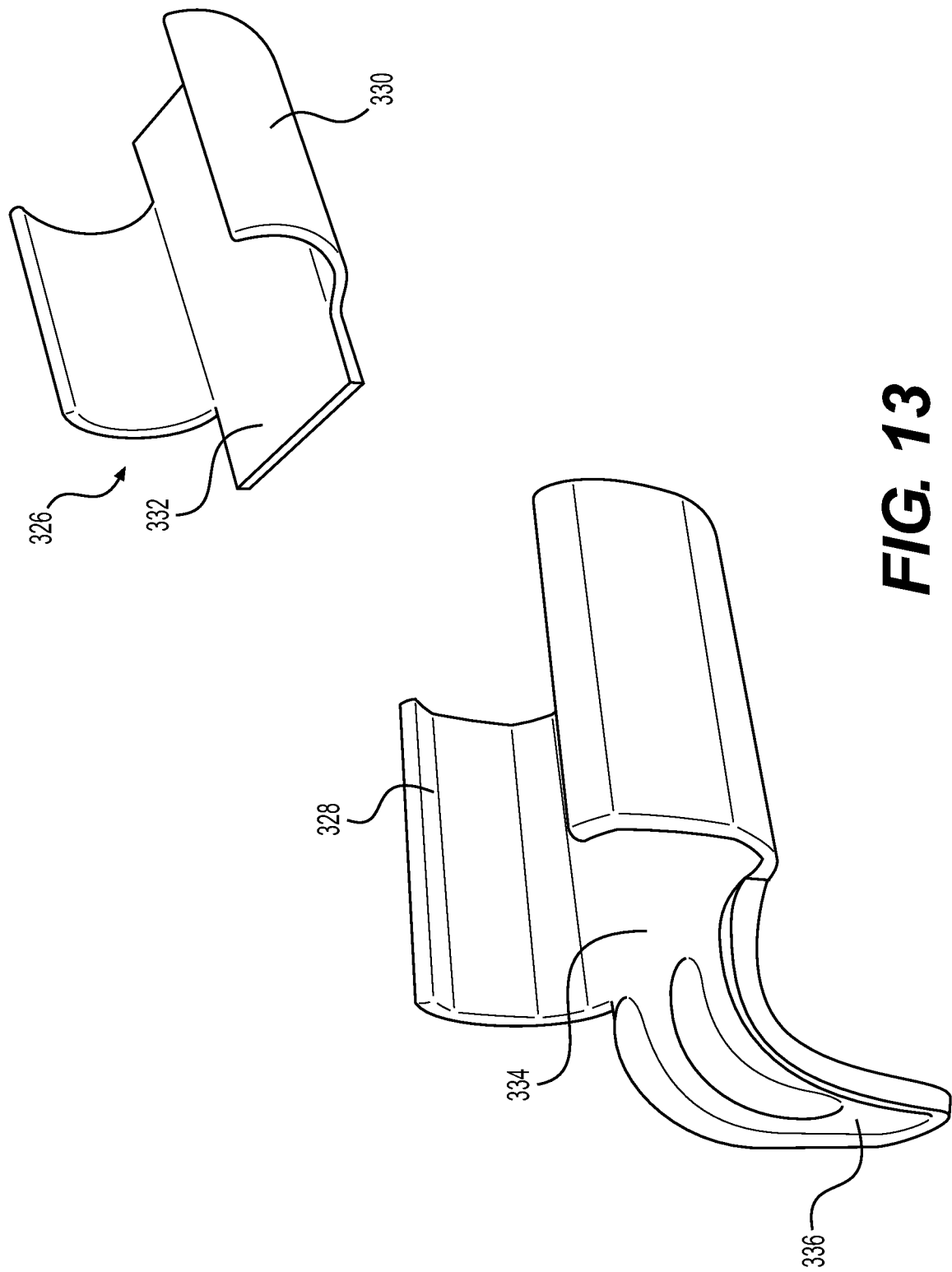
FIG. 13 is a perspective view of a first side of two different clips of the track of FIG. 5.

The clips 322, 324, 326 are shown in more detail in FIGS. 10, 13 and 14. In this implementation the clips 322, 324, 326 are made of a suitable metal. Each of the clips 322, 324, 326 are has a C-shaped portion 328, 330 that is mounted over a corresponding one of the transverse reinforcement rods 304, 306 and is deformed with a suitable tool over the rubber of the endless belt portion 145 covering that corresponding one of the transverse reinforcement rods 304, 306 and is thereby mounted to and retained on the track 144 (see FIG. 10 for an installed view for example). Referring to FIGS. 13 and 14, the centrally-placed clips 326 have a flat central portion 332 that is driven over by the drive sprocket 164 with each revolution of the track 144 around the frame 92 of the track assembly 90. Each of the side clips 322, 324 also has a flat central portion 334 that is driven over by the one of the slide rails 124, 126 corresponding to that side clip 322, 324. Additionally, each of the side clips 322, 324 also has an upstanding portion 336 that extends from the track 144 toward the frame 92 of the track assembly 90 as the flat central portion 334 of that side clip 322, 324 is driven over by the one of the slide rails 124, 126 corresponding to that side clip 322, 324.

Each of the upstanding portions 336 of the side clips 322, 324 is positioned such it passes between a corresponding one of the guide lugs 338 of the track 144 and a corresponding one of the slide rails 124, 126 when the side clip 322, 324 having that upstanding portion 336 is driven over by the corresponding one of the slide rails 124, 126 as the track 114 revolves around the track assembly 90. More particularly, as shown in FIG. 7 for example, the guide lugs 338 are distributed along and extend from an inner surface 340 of the track 144, with each of the slide rails 124, 126 being bordered by a longitudinal row of the guide lugs 338 on each of the left and right sides of that slide rail 124, 126. The guide lugs 336 help maintain the track 144 in transverse alignment relative to the slide rails 124, 126. The side clips 322, 324 are positioned in between each corresponding pair of rows of the guide lugs 336, and are oriented in an alternating pattern 342 shown schematically in FIG. 9.

For example, in the row of apertures 320, the upstanding portion 344 of a first one 346 of these side clips 324 is positioned on the right side of the row 320 and extends from the inner surface 340 of the track 144 toward the frame 92 of the track assembly 90, as shown with a schematic profile 348 of that clip 346. The upstanding portion 344 passes between the right side of the right slide rail 126 and a corresponding one of the guide lugs 338 when that clip 346 is driven over by the right slide rail 126. The upstanding portion 350 of the next one 352 of these side clips 324 is positioned on the left side of the row 320 and extends from the inner surface 340 of the track 144 toward the frame 92 of the track assembly 90, as shown with a schematic profile 354 of that clip 352. The upstanding portion 350 passes between the left side of the right slide rail 126 and a corresponding one of the guide lugs 338 when that clip 346 is driven over by the right slide rail 126. The next 356 one of the side clips 324 is positioned on the right side of the row 320, the same way as the clip 346.

This pattern repeats itself along the length of the track 144 in the row 320. In this implementation, the row of apertures 318 has the same pattern of clips 322 as the row 320 with respect to the left slide rail 124. It is contemplated that the pattern of clips 322 in the row 318 could be a mirror image of the pattern of clips 324 in the row 320 for example. The upstanding portions 344, 350 and the clips 346, 352, 356 are additionally shown schematically on the track 144 itself in FIG. 9 with hidden lines, with the upstanding portions 344, 350 being shown darker than the corresponding central portions 332, 334 of the corresponding clips 346, 352, 356. In an aspect, the pattern 342 of clips 322, 324 helps maintain the track 144 in transverse alignment with the slide rails 124, 126 in some applications. In some applications, the pattern 342 of clips 322, 324 helps reduce wear of the slide rails 124, 126 and guide lugs 338. The pattern 342 is referred to as a right-left-right pattern.

Exemplary Vehicle

An exemplary application of the track assembly 90 to a vehicle 266 is described next, with reference to FIGS. 7 and 8. The vehicle 266 is an ATV. It is contemplated that the vehicle 266 could be, instead, for example, a Side-by-Side Vehicle, or a motorized wheelchair configured to receive one or more of the track assembly 90.

The ATV 266 has a vehicle frame 268. The vehicle frame 268 supports a front left suspension 270, a front right suspension, a rear left suspension 274, and a rear right suspension. The rear left suspension 274 includes a swing arm 282. The rear right suspension includes a swing arm. The rear right suspension is a mirror image of the rear left suspension 274. Therefore, a description of the rear left suspension 274 corresponds to a description of the rear right suspension. Therefore, further description of the rear right suspension is omitted.

The vehicle frame 268 supports a front left axle 278, front right axle, a rear left axle 280, and a rear right axle. The rear right axle is supported by the rear right suspension. The rear left axle 280 is supported by the rear left suspension 274. The front right axle is supported by the front right suspension. The front left axle 278 is supported by the front left suspension 270.

The front right axle is a mirror image of the front left axle 278. The rear right axle is a mirror image of the rear left axle 280. Therefore, a description of the front left axle 278, and the rear left axle 280, corresponds to a description of the front right axle and the rear right axle, respectively. Therefore, further description of the front right axle and the rear right axle is omitted.

The vehicle frame 268 supports a motor 284. The motor 284 is connected to the rear left axle 280 via a transmission (not shown) to rotate the rear left axle 280 about a rear axle drive axis 286 to propel the vehicle 266.

The vehicle frame 268 pivotably supports a handlebar 288. The handlebar 288 is connected to the front axles 278 to pivot the front axles 278 to steer the ATV 266. Pivoting of the handlebar 288 pivots the front track assemblies 290 of the ATV and steers the ATV 266 when the ATV 266 is in motion.

The track assembly 90 is connected/attached to the rear left axle 280 by the drive wheel 164 being bolted to a wheel hub of the ATV 266, located at an outer end of the rear left axle 280 of the ATV 266, co-axial with an axis of rotation of the wheel hub of the rear left axle 280. The rear left axle 280 drives the wheel hub, and the wheel hub drives the drive wheel 164.

A rear right track assembly, which is a mirror image of the track assembly 90, is similarly connected to the rear right axle of the ATV. The rear right track assembly is a mirror image of the track assembly 90. Therefore, a description of the track assembly 90 corresponds to a description of the rear right track assembly 90. Therefore, further description of the rear right track assembly is omitted.

The front track assemblies 290 are connected to the front axles 278 and have tracks that are the same as the track shown in FIG. 6 mounted thereon. In this embodiment, the track 144 of the rear left track assembly 90 is of the embodiment shown in FIG. 5. In this implementation, the front track assemblies 290 have are structured to have an effective frame height 291 that is equal to the effective frame height 93 of the rear track assemblies. In some implementations, the front track assemblies 290 are structured such that their effective frame height 291 is within 1 inch (25.4 millimeters) of the effective frame height 93 of the rear track assemblies.

Ground Clearance Ratio

The ATV has a ground clearance 292, which is measured as an average distance of the bottom 300 of the ATV from terrain 302 when the ATV is on terrain 302 and is at its gross vehicle weight. The ground clearance 292 is sized to be about 18 inches (457.2 millimeters). In the present implementation, a ratio between the effective frame length 218 of the track assembly 90 and the ground clearance 292 is 2.67.

In some embodiments, the combination of the ground clearance 292 and the effective frame length 218 of the track assembly is sized to provide a ratio between the effective frame length 218 of the track assembly 90 and the ground clearance 292 that is between 2.6 and 3.5.

Dynamic Traction Device

The track assembly 90 includes the dynamic traction device 294 connected at one end 296 to the frame 92 of the track assembly 90, and to the frame 268 of the ATV 266 at another end 298. The dynamic traction device 294, and its functions, are shown and described in the commonly owned U.S. patent application Ser. No. 15/485,699, filed on Apr. 12, 2017 and entitled "Track System for Attachment to a Vehicle", which application is hereby incorporated herein in its entirety.

It is contemplated that a suitable anti-rotation link could be used instead of the dynamic traction device 294. Such an anti-rotation link could be connected between the vehicle frame 268 and the track assembly 90 and could be configured to limit rotation of the track assembly 90 relative to the ATV 266 so that the track assembly 90 does not come into contact with the vehicle frame 268 when the ATV 266 is in use. It is contemplated that in some cases, the track assembly 90 could be used without a dynamic traction device 294 and without an anti-rotation link.

Manufacturing and Materials

It is contemplated that new vehicles, such as the ATV 266, could be manufactured with one or more of the track assembly 90. It is contemplated an existing vehicle could be retrofitted by replacing, for example, one or more wheels of the existing vehicle with the track assembly 90.

Thus, the track assembly 90 could be sized and dimensioned to be attached to the rear axle of a vehicle when, for example, a rear wheel of that vehicle, is removed. It is contemplated that the track assembly 90 could be sized and dimensioned to be attached to more than one type of vehicle, and to more than one type of axle of the vehicle.

It is contemplated that the track assembly 90 could be sized and dimensioned to be attached to a front axle of a vehicle when, for example, a front wheel, is removed. It is contemplated that the track assembly 90 could be sized and dimensioned to replace a range of vehicle wheel sizes.

In the implementation of the track 144 shown in FIGS. 5, 9 and 10, besides the rods 304, 306, the track 144 is made of rubber, and also includes longitudinal fiberglass cord and tissue. It is contemplated that the track assembly 90 and the track 144 could be made of any suitable combination of materials. It is contemplated that the track 144 could be manufactured, assembled and sold separate from the track assembly 90. It is also contemplated that the track 144 could be made for other track assemblies. It is contemplated that the track assembly 90 could be manufactured, assembled, or sold without a track 144. It is contemplated that the track assembly 90 could be manufactured, assembled, or sold without a track 144 being mounted on the track assembly 90.

Embodiments of the present technology each have at least one of the above-mentioned object and/or aspects, but do not necessarily have all of them. It should be understood that some aspects of the present technology that have resulted from attempting to attain an above-mentioned object may not satisfy this object and/or may satisfy other objects not specifically recited herein.

Modifications and improvements to the above-described embodiments of the present technology may become apparent to those skilled in the art. The foregoing description is intended to be exemplary rather than limiting.

The invention claimed is:

1. A track assembly to be mounted to a rotatable rear axle of a vehicle, the rotatable rear axle being structured for mechanical attachment of a wheel thereto, comprising:

a frame having a front, a rear, a bottom, a left side, and a right side; the frame including a longitudinally-extending left slide rail positioned at the bottom of the frame, the left slide rail having a bottom surface, a front end having an upward curvature, a rear end and a length; and a longitudinally-extending right slide rail positioned at the bottom of the frame, the right slide rail having a bottom surface, a front end having an upward curvature, a rear end, and a length; wherein the longitudinally-extending left slide rail and the longitudinally-extending right slide rail define an interior space therebetween;

a drive wheel rotationally mounted to the frame for rotation about a drive wheel axis positioned in a vertical drive wheel plane, the drive wheel having a peripheral surface, the drive wheel being structured to be attached to the axle of the vehicle when the wheel is removed, the vertical drive wheel plane being positioned rearwardly from the front end of the left side rail and the front end of the right side rail;

a front idler wheel assembly mounted at the front of the frame for rotation about a front idler wheel assembly axis parallel to the drive wheel axis, the front idler wheel assembly having a peripheral surface;

a rear idler wheel assembly mounted at the rear of the frame for rotation about a rear idler wheel assembly axis parallel to the drive wheel axis, the rear idler wheel assembly having a peripheral surface;

the front idler wheel assembly being mounted in the interior space defined by the longitudinally-extending left slide rail and the longitudinally-extending right slide rail, between the upward curvatures of the front ends thereof, with the peripheral surface of the front idler wheel assembly extending forward of the front ends of the side rails; and a track having an inner surface facing the drive wheel, and an outer surface opposite the inner surface, the outer surface having a plurality of traction lugs distributed along the outer surface, the track including a plurality of longer transverse reinforcement rods distributed therethrough and a plurality of shorter transverse reinforcement rods distributed therethrough, the shorter transverse reinforcement rods being shorter in length than the longer transverse reinforcement rods, each of the longer and shorter transverse reinforcement rods being aligned along at least a part of its length with at least one of the traction lugs;

the drive wheel, the front idler wheel assembly and the rear idler wheel assembly being positioned relative to the frame to support the track around the drive wheel peripheral surface, the front idler wheel assembly peripheral surface, and the rear idler wheel assembly peripheral surface, the track being in driving engagement with the drive wheel, and the track assembly comprising:

a first plurality of L-shaped clips mounted to the track such that each clip of the first plurality of L-shaped clips passes with each revolution of the track around the frame of the track assembly between the left slide rail and the track, each clip of the first plurality of L-shaped clips having an upstanding L-portion extending from the track toward the frame of the track assembly;

a second plurality of L-shaped clips mounted to the track such that each clip of the second plurality of L-shaped clips passes with each revolution of the track around the frame of the track assembly between the right slide rail and the track, each clip of the second plurality of L-shaped clips having an upstanding L-portion extending from the track toward the frame of the track assembly; and a third plurality of L-shaped clips mounted to the track over a middle portion of each of the plurality of shorter transverse reinforcement rods such that each clip of the third plurality of L-shaped clips passes with each revolution of the track around the frame of the track assembly between the drive wheel and the track, each clip of the third plurality of L-shaped clips having an upstanding L-portion extending from the track toward the frame of the track assembly; and at least one of the front idler wheel assembly and the rear idler wheel assembly being selectively movable between a plurality of longitudinally-distributed tension positions to tension the track.

2. The track assembly of claim 1, wherein:
the frame has an effective frame length equal to a horizontal distance between a foremost point on the outer surface of the track and the rear idler wheel assembly axis, the effective frame length being between 48 inches and 60 inches, and
the frame has an effective frame height equal to a vertical distance between the drive wheel axis and a point on the outer surface of the track, the point being positioned directly below the drive wheel axis, the effective frame height being between 17 inches and 20 inches.

3. The track assembly of claim 1, wherein the drive wheel, wheels of the front idler wheel assembly and wheels of the rear idler wheel assembly are the sole wheels of the track assembly contacting the track.

4. The track assembly of claim 1, further comprising a plurality of mid-rollers, each mid-roller of the plurality of mid-rollers being connected to at least one of the left slide rail and the right slide rail to rotate about a mid-roller axis that defines a mid-roller plane with the drive wheel axis, the mid-roller plane defining an angle with the vertical drive wheel plane that has a magnitude of not more than 20 degrees.

5. The track assembly of claim 4, wherein the plurality of mid-rollers is positioned relative to the left slide rail and the right slide rail such that each mid-roller in the plurality of mid-rollers extends downward past the bottom surface of each of the left slide rail and the right slide rail by 2/25.4 inches to 6/25.4 inches.

6. The track assembly of claim 1, wherein at least some traction lugs in the plurality of traction lugs are longitudinally spaced from each other by 5 to 8 inches.

7. The track assembly of claim 1, wherein the rear idler wheel assembly has four idler wheels.

8. The track assembly of claim 1, wherein the track assembly further comprises a dynamic traction device having one end connected to the frame and another end connected to the vehicle when the track assembly is in use.

9. The track assembly of claim 1, wherein:
the front idler wheel assembly has a front idler wheel assembly radius,
the bottom surface of each of the left slide rail and the right slide rail has an upward curvature having an upward radius of curvature,
the upward curvatures of the left slide rail and the right slide rail are sized such that the track bends around the front idler wheel assembly and the upward curvatures of the left and right slide rails about an effective wheel radius, and the effective wheel radius is greater than each of the front idler wheel assembly radius and the upward radius of curvature.

10. The track assembly of claim 1, wherein the drive wheel, the front idler wheel assembly, the rear idler wheel assembly, the bottom surfaces of the left and right slide rails, and the track are sized and positioned relative to each other such that when:

the track assembly is mounted to the vehicle, the vehicle is traveling forward on flat level surface terrain covered with snow, and the track is being driven by the drive wheel about a path around the drive wheel, the front idler wheel assembly, the left and right slide rails, and the rear idler wheel assembly, each traction lug in the plurality of the traction lugs enters the snow substantially perpendicular to the flat level surface terrain and remains perpendicular to the flat level surface terrain as the track travels about its path at least until that traction lug begins to exit the snow.

11. The track assembly of claim 1, wherein the longer transverse reinforcement rods alternate with the shorter transverse reinforcement rods along a longitudinal direction in the track.

12. The track assembly of claim 11, wherein the longer transverse reinforcement rods alternate with the shorter transverse reinforcement rods in a long-short-long-short pattern.

13. The track assembly of claim 1, wherein:

each clip of the first and second pluralities of clips is mounted to the track over a longer transverse reinforcement rod of the plurality of longer transverse reinforcement rods, the upstanding L-portion of a first sub-plurality of clips of the first plurality of L-shaped clips is positioned on a left side of the left slide rail, the upstanding L-portion of a second sub-plurality of clips of the first plurality of L-shaped clips is positioned on a right side of the left slide rail, the upstanding L-portion of a first sub-plurality of clips of the second plurality of L-shaped clips is positioned on a left side of the right slide rail, and the upstanding L-portion of a second sub-plurality of clips of the second plurality of L-shaped clips is positioned on a right side of the right slide rail.

14. The track assembly of claim 13, wherein:

the first and second sub-pluralities of clips of the first plurality of L-shaped clips alternate in a right-left-right pattern along the track's length; and the first and second sub-pluralities of clips of the second plurality of L-shaped clips alternate in a right-left-right pattern along the track's length.

15. A vehicle having a rotatable rear axle that is structured for mechanical attachment of a wheel thereto, comprising the track assembly of claim 1, the track assembly being attached to the rear axle to support the vehicle on terrain.

16. The vehicle of claim 15, wherein the vehicle is one of: an All-Terrain Vehicle, a Side-by-Side Vehicle, and a wheelchair.

17. The vehicle of claim 15, wherein the vehicle has a ground clearance, and a ratio between the effective frame length of the frame of the track assembly and the ground clearance is between 2.6 and 3.5.

18. The vehicle of claim 17, further comprising a rotatable front axle and a front track assembly being attached to the front axle, the front track assembly having an effective frame height that is within 1 inch of the effective frame height of the track assembly that is attached to the rear axle.

* * * * *